(12) United States Patent
Zhao

(10) Patent No.: US 12,219,250 B2
(45) Date of Patent: *Feb. 4, 2025

(54) METHOD AND APPARATUS FOR CONTROLLING A STATE OF A CONTROLLABLE DEVICE

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 457 days.

This patent is subject to a terminal disclaimer.

(21) Appl. No.: 17/577,084

(22) Filed: Jan. 17, 2022

(65) Prior Publication Data

US 2022/0141377 A1 May 5, 2022

Related U.S. Application Data

(63) Continuation-in-part of application No. 16/479,233, filed as application No. PCT/CN2017/103414 on Sep. 26, 2017, now Pat. No. 11,258,636.

(30) Foreign Application Priority Data

Jan. 25, 2017 (CN) .......................... 201710056316.6

(51) Int. Cl.
*H04L 12/66* (2006.01)
*H04L 67/125* (2022.01)
(Continued)

(52) U.S. Cl.
CPC ......... *H04N 23/661* (2023.01); *H04L 67/125* (2013.01); *H04N 23/667* (2023.01); *H04N 23/695* (2023.01)

(58) Field of Classification Search
CPC ..... H04L 12/66; H04L 12/282; H04L 63/101; H04L 12/2809; H04L 63/107;
(Continued)

(56) References Cited

U.S. PATENT DOCUMENTS

2001/0034656 A1 10/2001 Lucas et al.
2002/0072356 A1 6/2002 Yamashita et al.
(Continued)

FOREIGN PATENT DOCUMENTS

CN 1364043 A 8/2002
CN 102710625 A 10/2012
(Continued)

OTHER PUBLICATIONS

International Search Report and Written Opinion from PCT/CN2017/103414 dated Dec. 19, 2017.
(Continued)

*Primary Examiner* — Dady Chery
(74) *Attorney, Agent, or Firm* — Calfee, Halter & Griswold LLP

(57) ABSTRACT

This disclosure provides a method for controlling a camera, the camera comprising a controllable component and associating with at least one associated client and a reference device, the method comprises: obtaining a first client list of the at least one associated client and a second client list of clients that are currently connected to the same local area network as the camera by connecting with the reference device; comparing the first client list with the second client list; and controlling a state of the controllable component so that the camera is in a first state when one or more of the at least one associated client are connected to the same local area network as the camera via the reference device and is in a second state when no associated client is connected to the same local area network as the camera.

24 Claims, 19 Drawing Sheets

(51) Int. Cl.
*H04N 23/661* (2023.01)
*H04N 23/667* (2023.01)
*H04N 23/695* (2023.01)

(58) Field of Classification Search
CPC ...... H04L 67/025; H04L 67/24; H04W 84/12; H04W 4/80; H04W 12/10
See application file for complete search history.

(56) References Cited

U.S. PATENT DOCUMENTS

| | | | | |
|---|---|---|---|---|
| 2008/0271123 | A1* | 10/2008 | Ollis | H04L 12/2818 726/4 |
| 2012/0303137 | A1* | 11/2012 | Schoeller | H04L 12/282 700/1 |
| 2016/0315784 | A1* | 10/2016 | Wu | H04L 12/2816 |

FOREIGN PATENT DOCUMENTS

| CN | 104062921 A | 9/2014 |
|---|---|---|
| CN | 104125125 A | 10/2014 |
| CN | 104898613 A | 9/2015 |
| CN | 105007207 A | 10/2015 |
| CN | 204926478 U | 12/2015 |

OTHER PUBLICATIONS

Office action from Chinese Application No. 201710056316.6 dated Apr. 24, 2020.
Office action from Chinese Application No. 201710056316.6 dated Sep. 29, 2020.
Office action from Chinese Application No. 201710056316.6 dated Nov. 17, 2020.
Office action from Chinese Application No. 201710056316.6 dated Jul. 26, 2021.
Office action from Chinese Application No. 201710056316.6 dated Nov. 29, 2021.
Office Action of the U.S. Appl. No. 16/479,233 dated May 26, 2021.
Office action from Chinese Application No. 201710056316.6 dated Sep. 27, 2020.
Notice of Allowance from U.S. Appl. No. 16/479,233 dated Oct. 15, 2021.
Office action from U.S. Appl. No. 16/479,233 dated May 26, 2021.
Office action from U.S. Appl. No. 16/479,233 dated Jul. 22, 2020.
Office action from U.S. Appl. No. 16/479,233 dated Dec. 1, 2020.

* cited by examiner

700

800

METHOD AND APPARATUS FOR CONTROLLING A STATE OF A CONTROLLABLE DEVICE

RELATED APPLICATIONS

The present application is a continuation-in-part application of U.S. patent application Ser. No. 16/479,233, filed on Jul. 19, 2019, which is the national stage entry of PCT/CN2017/103414, filed on Sep. 26, 2017, which claims priority to Chinese Application No. 201710056316.6 filed on Jan. 25, 2017, the entire disclosures of which are incorporated herein by reference.

FIELD

This disclosure relates to the field of communication technology, particularly to a camera, a method for controlling a camera and a control system.

BACKGROUND

With the development of internet of things and mobile internet technologies, there have been more and more varieties of terminal devices, the functions thereof have also been improved greatly. Generally, the terminal devices can be connected to a network in a wired or wireless manner, and can be remotely controlled and managed by other devices by means of a network server.

At present, a terminal device can support various modes. From the perspective of energy saving, the terminal device can support normal operating mode and power saving mode. From the perspective of privacy protection, the terminal device can support privacy protection mode, non-privacy protection mode, etc. However, when the terminal device is adjusted to different modes or states, in most cases, control over the terminal device, whether it is direct control or remote control through the network server, has to be performed manually. This results in a low degree of automation of control over the terminal device, which influences the user experience.

Therefore, solutions for mitigating or releasing the problems are required.

SUMMARY

In a first aspect, an embodiment of this disclosure provides a method for controlling a camera, the camera comprising a controllable component and associating with at least one associated client and a reference device, the reference device being a gateway of a local area network to which the camera is connected, the method comprises: obtaining a first client list of the at least one associated client and a second client list of clients that are currently connected to the same local area network as the camera by connecting with the reference device; comparing the first client list with the second client list so as to determine whether one or more of the at least one associated client are connected to the same local area network as the camera via the reference device; and controlling a state of the controllable component so that the camera is in a first state when one or more of the at least one associated client are connected to the same local area network as the camera via the reference device and is in a second state that is different from the first state when no associated client is connected to the same local area network as the camera via the reference device.

Optionally, the controllable component comprises a camera head, and the camera head comprises a lens configured to capture an image of a target object. In this case, controlling the state of the controllable component comprises: controlling a rotation angle of the camera head to adjust a direction in which the lens captures the image, so that in one state of the first state and the second state, the direction in which the lens captures the image is far away from an area where the target object is located, and in the other state of the first state and the second state, the direction in which the lens captures the image faces the area where the target object is located.

Optionally, the controllable component comprises a camera head and a hollow housing which is opaque, the camera head comprising a lens configured to capture an image of a target object, the hollow housing having a first opening, the camera head being arranged in the hollow housing, and the first opening facing the area where the target object is located. In this case, controlling the state of the controllable component comprises: controlling a rotation angle of the camera head to adjust a direction in which the lens captures the image so that in the one state of the first state and the second state, the direction in which the lens captures the image is away from the first opening, and in the other state of the first state and the second state, the direction in which the lens captures the image faces the first opening so that the direction faces the area where the target object is located.

Optionally, the controllable component comprises a camera head and a hollow housing which is opaque, the camera head comprising a lens configured to capture an image of a target object, the hollow housing having a first opening, the camera head being arranged in the hollow housing, and the first opening facing the area where the target object is located, and the controllable component further comprises a lens cover adapted to the first opening, and the direction in which the lens captures the image faces the first opening. In this case, controlling the state of the controllable component comprises: controlling a positioning of the lens cover so that in the one state of the first state and the second state, the lens cover closes the first opening, and in the other state of the first state and the second state, the lens cover leaves the first opening so as to open the first opening.

Optionally, controlling the positioning of the lens cover comprises: controlling the positioning of the lens cover so that in the one state of the first state and the second state and under the condition that the lens has captured the target image, the lens cover closes the first opening.

Optionally, the controllable component comprises a camera head and a hollow housing which is opaque, the camera head comprising a lens configured to capture an image of a target object, the hollow housing having a first opening, the camera head being arranged in the hollow housing, and the first opening facing the area where the target object is located, and the hollow housing further has a second opening. In this case, controlling the state of the controllable component comprises: controlling the camera head so that in the one state of the first state and the second state, the camera head protrudes out of the hollow housing through the second opening, and in the other state of the first state and the second state, the camera head is located in the hollow housing and the direction in which the lens captures the image faces the first opening.

Optionally, the controllable component further comprises a supporting component, a base and a base motor, and the camera head is connected to the base via the supporting component. In this case, controlling the camera head comprises: controlling a height of the camera head relative to the base via the supporting component.

Optionally, the controllable component further comprises a color changing component. In this case, controlling the state of the controllable component comprises: controlling the color of the color changing component so that the color of the color changing component in the first state is the first color, and the color of the color changing component in the second state is the second color.

Optionally, the controllable component comprises a network module, and the network module has a plurality of networking modes. In this case, controlling the state of the controllable component comprises: controlling the network module so that in the first state, the network module adopts the first networking mode of the plurality of networking modes, and in the second state, the network module adopts the second networking mode of the plurality of networking modes.

Optionally, the controllable component has a plurality of functions. In this case, controlling the state of the controllable component comprises: controlling the controllable component to perform a first function of the plurality of functions in the first state, and a second function of the plurality of functions in the second state.

In a second aspect, an embodiment of this disclosure further provides a camera associating with at least one associated client and a reference device, the reference device being a gateway of a local area network to which the camera is connected, and the camera comprises: an obtainer configured to obtain a first client list of the at least one associated client and a second client list of clients that are currently connected to the same local area network as the camera by connecting with the reference device; a comparator configured to compare the first client list with the second client list so as to determine whether one or more of the at least one associated client are connected to the same local area network as the camera via the reference device; a controllable component; a controller configured to control a state of the controllable component so that the camera is in a first state when one or more of the at least one associated client are connected to the same local area network as the camera via the reference device and is in a second state that is different from the first state when no associated client is connected to the same local area network as the camera via the reference device.

Optionally, the controllable component comprises a camera head, and the camera head comprises a lens configured to capture an image of a target object.

Optionally, the controller is configured to control a rotation angle of the camera head to adjust a direction in which the lens captures the image, so that in one state of the first state and the second state, the direction in which the lens captures the image is far away from an area where the target object is located, and in the other state of the first state and the second state, the direction in which the lens captures the image faces the area where the target object is located.

Optionally, the controllable component further comprises a hollow housing which is opaque, the hollow housing having a first opening, the camera head being arranged in the hollow housing, and the first opening facing the area where the target object is located.

Optionally, the controller is further configured to control a rotation angle of the camera head to adjust a direction in which the lens captures the image so that in the one state of the first state and the second state, the direction in which the lens captures the image is away from the first opening, and in the other state of the first state and the second state, the direction in which the lens captures the image faces the first opening so that the direction faces the area where the target object is located.

Optionally, the controllable component further comprises a lens cover adapted to the first opening, and the direction in which the lens captures the image faces the first opening. In this case, the controller is further configured to control a positioning of the lens cover so that in the one state of the first state and the second state, the lens cover closes the first opening, and in the other state of the first state and the second state, the lens cover leaves the first opening so as to open the first opening.

Optionally, the controller is further configured to control the positioning of the lens cover so that in the one state of the first state and the second state and under the condition that the lens has captured the target image, the lens cover closes the first opening.

Optionally, the hollow housing further has a second opening; and the controller is configured to control the camera head so that in the one state of the first state and the second state, the camera head protrudes out of the hollow housing through the second opening, and in the other state of the first state and the second state, the camera head is located in the hollow housing and the direction in which the lens captures the image faces the first opening.

Optionally, the controllable component further comprises a supporting component, a base and a base motor, and the camera head is connected to the base via the supporting component; and the base motor is configured to control a height of the camera head relative to the base via the supporting component.

Optionally, the controllable component further comprises a color changing component; and the controller is configured to control the color of the color changing component so that the color of the color changing component in the first state is the first color, and the color of the color changing component in the second state is the second color.

Optionally, the controllable component comprises a network module, and the network module has a plurality of networking modes; and the controller is configured to control the network module so that in the first state, the network module adopts the first networking mode of the plurality of networking modes, and in the second state, the network module adopts the second networking mode of the plurality of networking modes.

Optionally, the controllable component has a plurality of functions; and the controller is configured to control the controllable component to perform a first function of the plurality of functions in the first state, and a second function of the plurality of functions in the second state.

In a third aspect, an embodiment of this disclosure further provides a control system, comprising: the camera as stated above; a reference device, configured to be a gateway of a local area network to which the camera is connected; at least one client, configured to be currently connected to the same local area network as the camera by connecting with the reference device.

In a fourth aspect, an embodiment of this disclosure further provides a computer readable storage medium on which a computer instruction is stored, and the instruction, when executed by a processor, performs the steps of the method stated above.

BRIEF DESCRIPTION OF THE DRAWINGS

The following explanations and drawings expound some illustrative aspects and implementations of embodiments of this disclosure. These only indicate that several of the various manners in one or more aspects can be used. When considered in conjunction with the drawings, other aspects, advantages and novel features of this disclosure will become obvious in the following detailed description.

DETAILED DESCRIPTIONS

In the following description, for explanation rather than limitation, some particular details such as architecture, interface and technology of the disclosed embodiments are stated, so as to understand this disclosure clearly and thoroughly. However, the skilled person in the art should understand easily that this disclosure can be implemented in other embodiments that do not conform exactly to the details set forth herein, without departing significantly from the spirit and scope of this disclosure. Further, in this context, and for the purpose of brevity and clarity, detailed descriptions of well-known apparatus, circuits and methodology have been omitted so as to avoid unnecessary detail and possible confusion.

Figure 1:
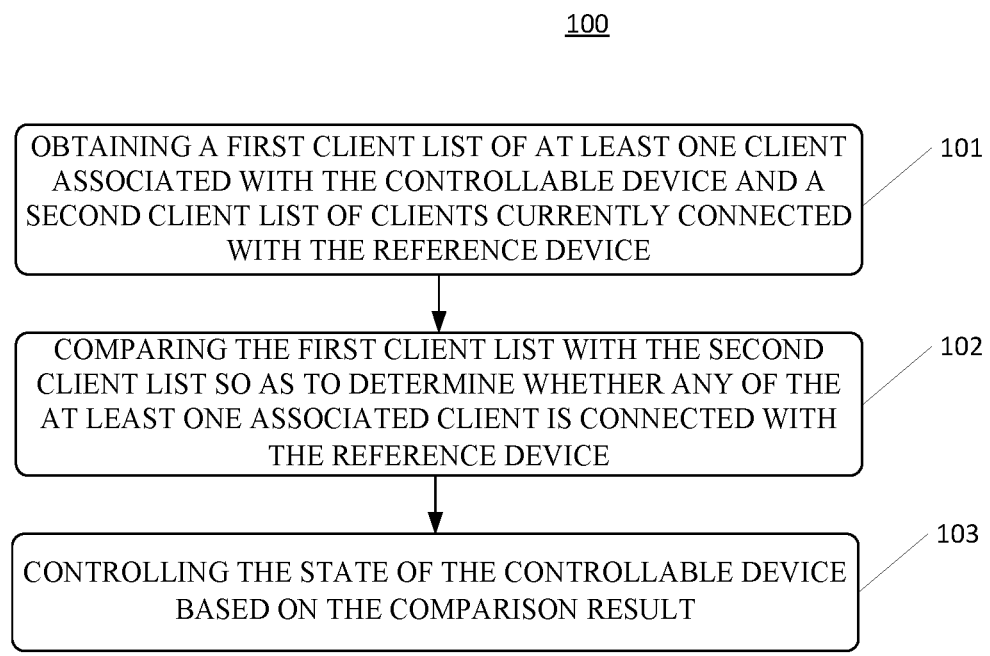
FIG. 1 shows a flow chart of a method for controlling a state of a controllable device according to an embodiment of this disclosure.

FIG. 1 shows a method 100 for controlling a state of a controllable device according to an embodiment of this disclosure.

In some embodiments, the controllable device is a device that can be controlled to change its state. For example, the controllable device can include a camera, a fingerprint lock or an intelligent electrical appliance involved in smart home, such as intelligent air conditioning, intelligent refrigerator. The controllable device can be controlled locally or controlled remotely via a network. According to an embodiment of this disclosure, the controllable device is configured to associate with at least one associated client and a reference device.

At step 101, a first client list of at least one client associated with the controllable device and a second client list of client(s) currently connected with the reference device are obtained.

In an embodiment of this disclosure, a client may be in a form of software, such as a software component, a program, an application, a computer program, an application program, a system program, a machine program and so on. The client may also be in a form of hardware. For example, the client may be a portable mobile device, such as a mobile phone, a personal digital assistant, a portable game machine, a wearable device. Corresponding to clients in different forms, the manners of recording or identifying the clients may also be different. The client in the form of software can for example be recorded through the user name of the user of the client. The client in the form of hardware can be recorded through the device identification related to the hardware of the client, such as medium access control (MAC) address of a network device or the international mobile equipment identifier (IMEI) of a mobile device, or can also be recorded through the user identification allocated to the client, such as the international mobile subscriber identification (IMSI) of the mobile device or the number of a mobile phone.

In some embodiments, the client can be a client registered with the server as being associated with the controllable device. The server generates a first client list based on registered clients, so as to indicate the associated clients of the controllable device. Additionally or alternatively, the first client list can also be created by a user and clients associated with the controllable device are manually included therein.

For example, the controllable device may be a camera which comprises at least one associated client, such as mobile phones S1, S2, S3. According to an embodiment of this disclosure, on the one hand, the mobile phones S1, S2 may be registered with the server so as to become associated clients of the camera. On the other hand, the mobile phone S3 can become an associated client of the camera through setting of a user (i.e., operator) of the camera without being registered with the server.

In some embodiments, the first client list may be maintained by the server. In these embodiments, the controllable device can access the server, so as to obtain from the server the first client list that records the associated clients thereof. The server may be a local server in the same home local area network as the controllable device, and may also be a remote server in a wide area network, such as the internet. The controllable device may be connected to the server through a network access device. The network access device for example is a wireless access point, a router, a hub, a gateway, a bridge or a combination thereof. The network access device is optionally a gateway of a local area network. In this case, as an example, a first client list of the at least one associated client and a second client list of clients that are currently connected to the same local area network as the camera by connecting with the reference device are obtained.

In an embodiment of this disclosure, the reference device may be a device physically or logically associated with the controllable device. In some embodiments, the reference device may be a device physically close to the controllable device. For example, when the controllable device is in a certain local area network, the reference device may be set as a gateway through which the controllable device accesses the local area network. In some other embodiments, the reference device may be a device logically, such as in network topology, close to the controllable device. For example, when the controllable device is connected to a server through a network (adjacent to the server in the network topology) and for example can accept control via the server, the reference device may be set as the server. In some further embodiments, the reference device can also be set as the controllable device per se.

A client in a client list may be identified through the identification information of the client, as long as the identification information can identify the client uniquely. In an embodiment of this disclosure, the identification information of the client includes but not limited to a user name of the client, a device name, a MAC address etc.

Optionally, an associated client of a controllable device can control the controllable device. In one implementation, the associated client can control the controllable device remotely by means of a network server. It can be understood that there may also be no control relationship between the associated client and the controllable device.

At step 102, the obtained first client list and second client list are compared so as to determine whether any of the at least one associated client is connected with the reference device. The first and second client lists can include one or more clients. Or, in the event that no client is currently connected with the reference device, the second client list may also be empty.

In an embodiment of this disclosure, because the first client list corresponds to associated client(s) of the controllable device, and the second client list corresponds to clients connected to the reference device, the information on connection between each of the associated client(s) and the reference device may be obtained by comparing the first client list with the second client list. For example, if the result of the comparing indicates that one or more clients in the first client list match with the clients in the second client list, it represents that the one or more associated clients are being connected with the reference device currently. If all of the client(s) in the first client list match with the clients in the second client list, it represents that all of the associated client(s) are being connected with the reference device currently. If no client in the first client list matches with the clients in the second client list, it represents that no associated client is connected with the reference device currently. The result of the comparing can further indicate that there are also other clients than the associated clients connected with the reference device. It can be understood that in some scenes, there may be associated or unassociated clients of one or more controllable devices connected with the reference device simultaneously. As an example, the first client list may be compared with the second client list to determine whether one or more of the at least one associated client are connected to the same local area network as the camera via the reference device.

At step 103, state of the controllable device is controlled based on the result of the comparing.

According to an embodiment of this disclosure, various modes may be used to control the state of the controllable device based on for example the comparison result indicating the information on the connection between each of the associated client(s) of the controllable device and the reference device. The control mode depends on the user's requirement. The user can design corresponding control strategies based on his/her own requirement, just as detailed in the following.

In an example scene, the controllable device may be a camera, the associated client thereof is a mobile phone, and the reference device is a gateway of the local area network where the camera locates.

When the camera for example is used by user A whose profession is a network anchor, user A may hope that the camera starts live broadcast through the network only when he/she is in the vicinity of the camera. Correspondingly, the control strategy may be designed as: when the mobile phone of user A is connected to the same local area network as the camera, i.e., the mobile phone of the anchor is connected with the gateway of the local area network, controlling the state of the camera to enable the camera to enter a video mode so as to perform webcast. Additionally or alternatively, the control strategy can also be designed as: when the mobile phone of user A is connected to the same local area network as the camera, controlling the state of a network connection component of the camera, to enable the camera to be connected to the internet via the network connection component, so as to transmit the captured video to the network for online live show. However, when the mobile phone of user A is not connected to the local area network, the network connection component disconnects the connection with the internet, to enable the camera to be in an off-line state so as to stop the webcast.

When the camera for example is used by an ordinary user B, user B may hope that the camera stops video-capturing as long as he/she is in the vicinity of the camera, so as to avoid his/her private life being recorded. Correspondingly, the control strategy therefor may be designed in a completely opposite way as: when the mobile phone of the ordinary user B is connected to the same local area network as the camera, i.e., the mobile phone of the ordinary user B is connected with the gateway (reference device) of the local area network, controlling the state of the camera, to enable to the camera to quit from the previous video mode so as to switch to the sleep mode.

In some embodiments, the controllable device comprises a controllable component, and controlling the state of the controllable device includes controlling the state of the controllable component. That is, the state of the controllable component can be controlled so that the camera is in a first state when one or more of the at least one associated client are connected to the same local area network as the camera via the reference device and is in a second state that is different from the first state when no associated client is connected to the same local area network as the camera via the reference device. The controllable component of the controllable device can include a mechanical structure and an electronic component and the like. The state of the controllable component of the controllable device can include at least one of the following: the state of the mechanical structure and the working mode of the electronic component etc. For example, the mechanical structure may include a rotation mechanism, and the state of the mechanical structure includes a rotatable state and a non-rotatable state or a state of rotating to a certain angle etc. The electronic component may include a mode switch, and the working mode of the electronic component may include an active mode (i.e., normal working mode) and a sleep mode etc.

In some embodiments, the mechanical structure state of the controllable device for example is the normal working state of an actuator or the abnormal working state of the actuator. Take the camera as an example, controlling the state of the mechanical structure (e.g., a rotatable mechanism) of the camera may be e.g., enabling the camera to be in the normal working state in which it faces towards a preset monitoring area, or enabling the camera to be in an abnormal working state in which it deviates from the preset monitoring area (by adjusting the rotatable mechanism). Additionally or alternatively, the mechanical structure can also be a protection mechanism in front of the lens of the camera. Correspondingly, controlling the state of the mechanical structure of the camera may e.g., enable the protection mechanism of the camera to be in a normal working state of not blocking the lens or in an abnormal working state of blocking the lens (by changing the position of the protection mechanism).

In some embodiments, working mode of the circuitry in the controllable device can also be a normal working mode or an abnormal working mode. Take the camera as an example, controlling the working mode of the electronic component (e.g., the mode switch) of the camera for example may enable the camera to be in an active mode or a sleep mode.

As pointed out above, when the state of the controllable device is controlled based on the result of the comparing, depending on different scenes, different control strategies may be employed to control the state of the controllable device even if the comparison result is the same. Next, it will be further explained how to control the state of the controllable device in conjunction with several different example scenes.

In a first example scene, the controllable device is a home camera. The associated client of the controllable device may be a mobile phone that is often carried by a user of the camera. The camera and the mobile phone may be both connected to the same local area network through a gateway. The gateway is the reference device of the controllable device.

Initially, the camera may be in a normal working state, e.g., a video-capturing state. When it is detected that a mobile phone is connected to the gateway, the identification information of the mobile phone is obtained and is compared with the identification information of an associated client(s) of the camera. When the comparison result indicates that the identification information of the mobile phone matches with the identification information of a respective associated client of the camera, it can be learnt that an associated client is connected with the reference device, i.e., it indicates that the user has been at home. At this point, if the preset control strategy is a privacy protection strategy, the working mode of the electronic component of the camera may be adjusted correspondingly, for example, converting the normal working mode of the camera to the abnormal working mode (such as sleep mode or standby mode) so as to stop video-capturing. Alternatively, the mechanical structure state of the camera may be adjusted correspondingly, for example, making the lens be rotated from pointing to the effective monitoring area to pointing to the ineffective area, or making the protection mechanism of the camera be changed from a position of not blocking the lens to a position of blocking the lens, so as to avoid monitoring of the user's privacy.

However, when the associated mobile phone disconnects from the gateway, it can be learnt by obtaining the identification information of mobile phone(s) currently connected with the gateway and comparing the obtained identification information with the identification information of the associated clients of the camera that no associated client is connected with the reference device, i.e., indicating that the user may possibly go out. At this point, the camera may be controlled to convert its working mode, for example, making it return to the normal working mode so as to start video-capturing. Alternatively, the camera may be controlled to convert the state of its mechanical structure, for example, making the lens point to the effective monitoring area, or making the protection structure of the camera return to the position of not blocking the lens so as to start monitoring.

It could be understood that the design of the control strategy depends on the user's requirement. For example, based on the user's requirement, the control strategy can be designed as: when it is detected that mobile phones connected to the gateway not only include the associated mobile phone of the camera but also includes other unassociated mobile phones connected as visitors, making the camera to keep the active mode, i.e., continuing video-capturing.

In a second example scene, the controllable device is a fingerprint lock in an entrance guard system. Similarly, the associated client of the controllable device may be a mobile phone that is often carried by a user of the entrance guard system. The fingerprint lock and the mobile phone may be both connected to the same local area network through a gateway. The gateway is the reference device of the controllable device.

Initially, the fingerprint lock may be in a disabled state, i.e., a state of disabling unlock. When it is detected that a mobile phone is connected to the gateway, the identification information of the mobile phone is obtained and is compared with the identification information of the associated clients of the fingerprint lock. When the comparison result indicates that the identification information of the mobile phone matches with the identification information of a respective associated client of the fingerprint lock, it can be learnt that an associated client is connected with the reference device, i.e., it indicates that the user has been at home. At this point, the working mode of an electronic component of the fingerprint lock may be controlled correspondingly, for example, making a fingerprint scanning component of the fingerprint lock to be converted from the disable mode to an enable mode so as to enable the fingerprint scanning function, thereby allowing the user to unlock with his fingerprint.

When the mobile phone disconnects from the gateway, it can be learnt by obtaining the identification information of the mobile phone currently connected with the gateway and comparing the obtained identification information with the identification information of the associated clients of the fingerprint lock that no associated client is connected with the reference device, i.e., it indicates that the user may possibly go out. At this point, the fingerprint lock may be controlled to convert its state, for example, making the fingerprint scanning component to return to the disable mode so as to disable the fingerprint scanning function. This can further improve the security of the fingerprint lock and further reduce the working time of the fingerprint lock so as to prolong the lifetime.

The above first example scene and second example scene show embodiments of applying the technology of this disclosure in the environment of home LAN. However, it could be understood that the technology of this disclosure can also be applicable for an environment of a wide area network, e.g., the environment of Internet.

In a third example scene, the controllable device is an intelligent device in a smart home system that can accept remote control via a network, such as an intelligent refrigerator, an intelligent washing machine, an intelligent switch etc. An associated client of the controllable device may be a personal computing device of a user of the smart home system, for example a desktop computer, a tablet computer, a mobile phone, a personal digital assistant etc. The intelligent device and the personal computing device may be both connected to a server provided by a service provider via the network (e.g., internet), and the personal computing device can perform remote control over the intelligent device by means of the server. The server is the reference device of the controllable device.

Initially, the intelligent device may be in a non-network-controllable state. When it is detected that a personal computing device is connected to the server, the identification information of the personal computing device is obtained and is compared with the identification information of associated clients of the intelligent device. When the comparison result indicates that the identification information of the personal computing device matches with the identification information of a respective associated client of the intelligent device, it can be learnt that an associated client is connected with the reference device. At this point, the state of the intelligent device may be controlled correspondingly. For example, the controllable component (such as the parameter configuration component) of the intelligent device may be converted from the non-network-controllable mode to a network-controllable mode, so as to allow the user to perform remote control.

When the personal computing device disconnects from the server, it can be learnt by obtaining the identification information of the personal computing device currently connected with the server and comparing the obtained identification information with the identification information of associated clients of the intelligent device that no associated client is connected with the reference device. At this point, the user may have performed remote control over the intelligent device or the user does not require to remotely control the intelligent device. Thus, the state of the intelligent device may be controlled correspondingly. For example, its controllable component may be made to return to the non-network-controllable mode. This allows to better protect the intelligent device from malicious intrusion and improve security of the smart home system.

It should be understood that the above scenes are merely possible application for explaining the methods of embodiments of this disclosure. The embodiments of this disclosure is further applicable for other various scenes.

According to embodiments of this disclosure, the state of the controllable device is controlled based on the state of the connection between the associated client(s) of the controllable device and the reference device, which allows to realize automatic control over the controllable device, avoiding manual control and improving user experience.

In different implementations of embodiments of this disclosure, different devices may be used as the reference device of the controllable device. Moreover, the method according to embodiments of this disclosure may be executed by different executive subjects. For example, the reference device may be a network access device by means of which the controllable device accesses the communication network, such as a gateway in the same local area network with the controllable device, and may also be a server to which the controllable device is connected through a wide area network and by which the controllable device may be remotely controlled, or can even be the controllable device itself. In some implementations, the method according to embodiments of this disclosure may be executed by the controllable device and can also be executed by the reference device.

In FIG. 2, FIG. 3, FIG. 4 and FIG. 5, example implementations of methods according to embodiments of this disclosure are provided.

Figure 2:
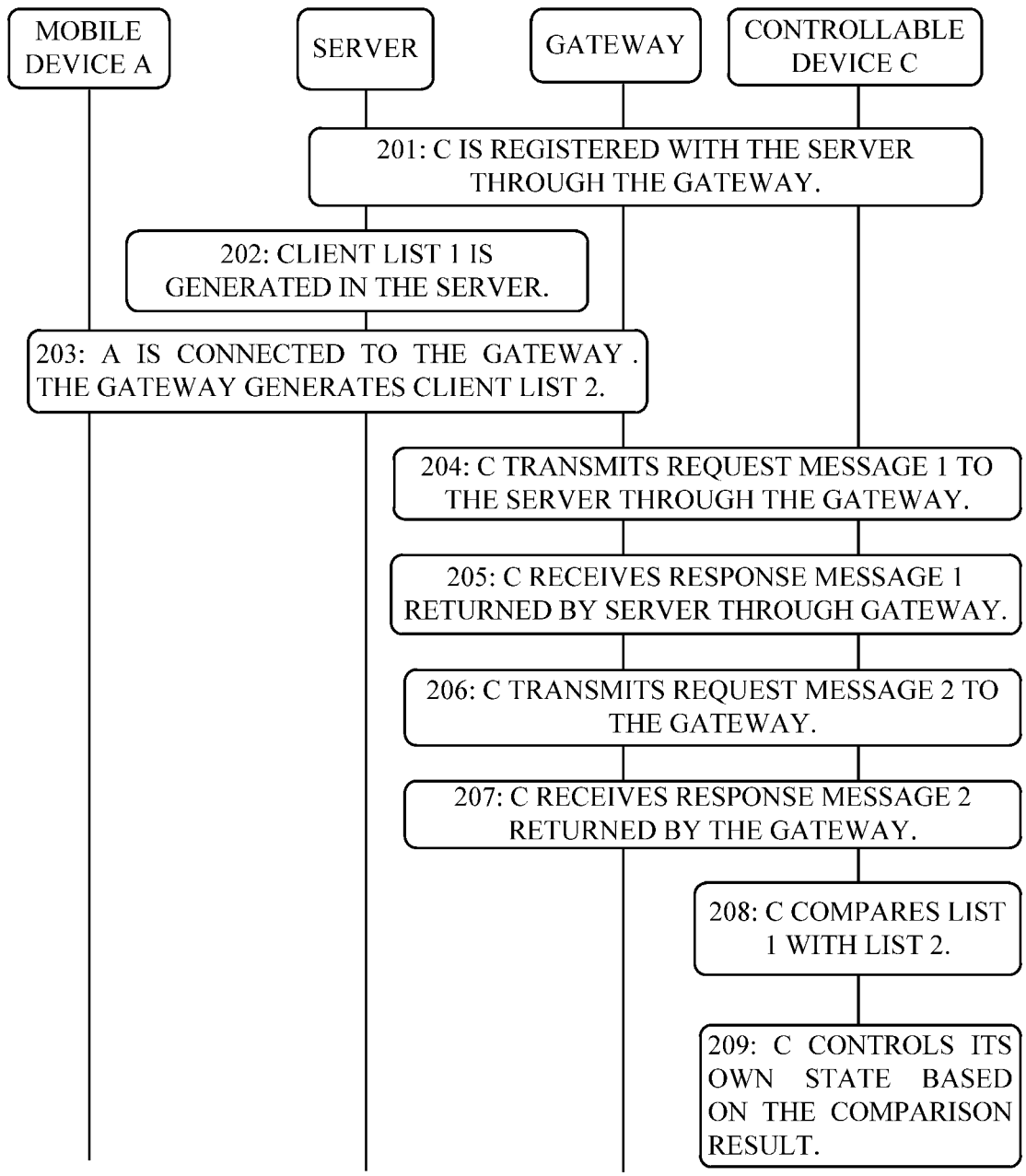
FIG. 2 shows an example implementation of a method according to an embodiment of this disclosure.

FIG. 2 shows an example implementation of a method according to an embodiment of this disclosure. In this implementation, it is assumed that controllable device C (such as a home camera) is connected to a server via a gateway, controllable device C has an associated client, i.e., mobile device A, and the gateway is the reference device. In this implementation, the method for controlling the state of the controllable device may be carried out by the controllable device C.

Referring to FIG. 2, the method 200 for controlling the state of the controllable device can comprise the following steps.

Step 201: Controllable device C is registered with the server through the gateway. The server can store identification information of controllable device C. The identification information of controllable device C can include the device name, the MAC address etc.

Step 202: Client list 1 of clients associated with controllable device C is generated in the server.

In one embodiment, mobile device A (such as a mobile phone) is registered with the server as an associated client of controllable device C. The server can store the identification information of mobile device A, and accordingly generate client list 1 containing the identification information of the associated client of controllable device C. Optionally, in the event that client list 1 already exists, the server can add the identification information of mobile device A into client list 1. The identification information of mobile device A can include the device name, the MAC address etc.

In another embodiment, client list 1 may be created by a user of controllable device C in the server. The user can set an associated client of the controllable device in client list 1, including adding or deleting an associated client of the controllable device.

FIG. 2 only shows one associated client of controllable device C, e.g., mobile device A. However, it could be understood that controllable device C may have a plurality of associated clients.

Step 203: When mobile device A reaches the local area network where controllable device C locates, mobile device A is connected to the gateway. The gateway stores the identification information of the client (including mobile device A) connected with it, and accordingly generates client list 2. At this point, client list 2 contains the identification information of mobile device A.

Step 204: Controllable device C transmits request message 1 to the server through the gateway to request the server to provide client list 1.

Step 205: Controllable device C receives response message 1 returned by the server through the gateway, which response message 1 may carry client list 1.

Client list 1 may contain the identification information of the associated client (e.g., mobile device A) of controllable device C.

Step 206: Controllable device C transmits request message 2 to the gateway to request the gateway to provide client list 2.

Step 207: Controllable device C receives response message 2 returned by the gateway, which response message 2 may carry client list 2. Client list 2 may contain the identification information of the mobile device (e.g., mobile device A) connected with the gateway.

Step 208: Controllable device C compares client list 1 with client list 2 so as to determine whether any of associated client(s) is connected with the reference device. For example, controllable device C can match the identification information in client list 1 and client list 2.

Step 209: Controllable device C controls its own state, e.g., controlling the state of its controllable component, based on the comparison result. In one embodiment, controllable device C determines whether an associated client of controllable device C is connected with the gateway based on the comparison result. In the example as shown in FIG. 2, because mobile device A is the associated client of controllable device C, the determination result is "Yes". At this point, depending on the designed control strategy, controllable device C can thus be triggered to change its own state.

It could be understood that if, at step 203, it is another unregistered mobile device A' reaches the local area network where controllable device C locates, because mobile device A' is not an associated client of controllable device C, the determination result here is "No". Accordingly, controllable device C can keep the previous state.

In some embodiments, controllable device C can repeat the above steps 204 to 209 at certain time intervals. Optionally, controllable device C can also repeat the above steps 204 to 209 when it is learnt that clients connected with the gateway change. In some embodiments, the gateway can, when the client connected with it changes, inform controllable device C of the change. This allows the control over controllable device to respond to the change of its associated client more rapidly.

Figure 3:
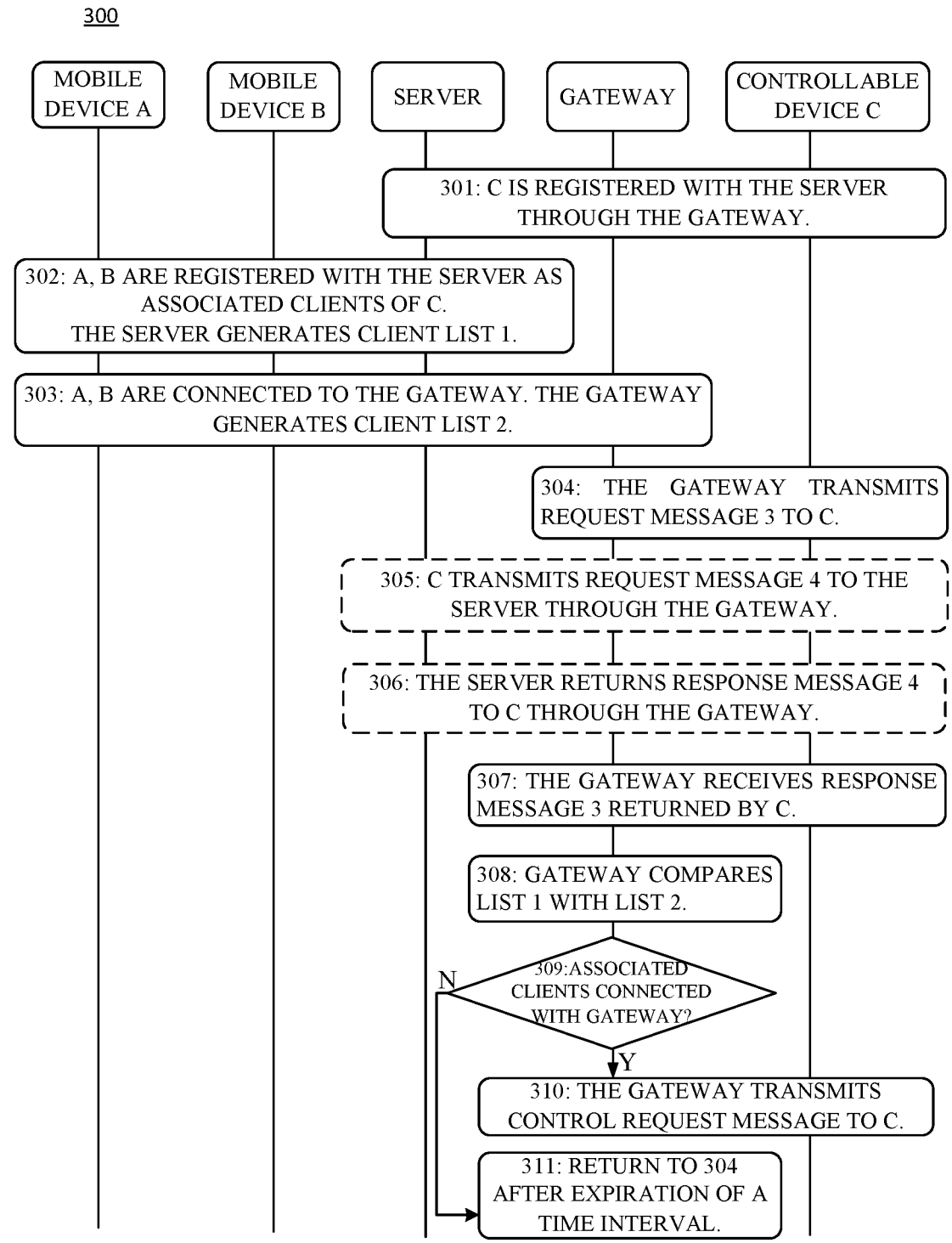
FIG. 3 shows another example implementation of a method according to an embodiment of this disclosure.

FIG. 3 shows another example implementation of a method according to an embodiment of this disclosure. In this implementation, similar to FIG. 2, it is assumed that controllable device C is connected to the server via a gateway, and the gateway is the reference device. Different from FIG. 2, FIG. 3 shows that controllable device C has two associated clients, i.e., mobile devices A and B, and the method for controlling the state of the controllable device is carried out by the reference device, e.g., the gateway.

Referring to FIG. 3, the method 300 for controlling the state of controllable device can comprise the following steps.

Step 301: Controllable device C is connected with a gateway, and is registered with the server through the gateway. The server stores the identification information of controllable device C. The identification information of controllable device C can include the device name, the MAC address etc.

Step 302: Mobile devices A and B are connected with the server, and are registered with the server as the associated clients of controllable device C. The server stores the identification information of mobile devices A, B, and accordingly generates client list 1 containing the identification information of the associated clients of controllable device C. The identification information of mobile device A or B can include the device name, the MAC address etc. It could be understood that mobile devices A and B can perform the registration simultaneously or at different times.

Step 303: When mobile devices A, B reach the local area network where controllable device C locates, mobile devices A, B are connected to the gateway. The gateway stores the identification information of mobile devices A, B, and accordingly generates client list 2 containing the identification information of mobile devices A, B. It could be understood that mobile devices A and B may be connected with the gateway simultaneously or at different times.

Step 304: The gateway transmits request message 3 to controllable device C to request controllable device C to provide client list 1 of the associated clients of controllable device C.

Step 305: Because client list 1 of the associated clients of controllable device C is maintained by the server, controllable device C transmits request message 4 to the server through the gateway to request the server to provide client list 1.

Step 306: The server returns response message 4 to controllable device C through the gateway, which response message 4 may carry client list 1.

Step 307: The gateway receives response message 3 returned by controllable device C, which response message 3 may carry client list 1.

In some embodiments, controllable device C can generate and maintain client list 1 by itself, and it can return client list 1 to the gateway directly after receiving the request of the gateway. Thus, the steps 305 and 306 may be omitted.

Step 308: The gateway compares client list 1 with client list 2 so as to determine whether any of the associated client is connected with the reference device.

The gateway controls the state of the controllable component of controllable device C based on the comparison result. In one embodiment, at step 309, the gateway determines whether the associated clients of controllable device C are connected with it based on the comparison result. In this example, because the determination result is "Yes", at step 310, the gateway transmits a control request message to controllable device C to request controllable device C to control the state of its controllable component accordingly, for example, changing its own state, such as adjusting the state of its mechanical structure or the working mode of its electronic component.

In other cases, if other unregistered mobile devices A', B' reach the local area network where controllable device C locates at step 303, because neither of mobile devices A' and B' is associated client of controllable device C, the determination result at step 310 is "No", which indicates that no associated client is connected with the gateway. The gateway can transmit no control request message to controllable device C accordingly, and at step 311, return to step 304 after expiration of a certain time interval, so as to repeat this process. Optionally, the gateway can also repeat this process upon detection of change of the client connected with it.

Figure 4:
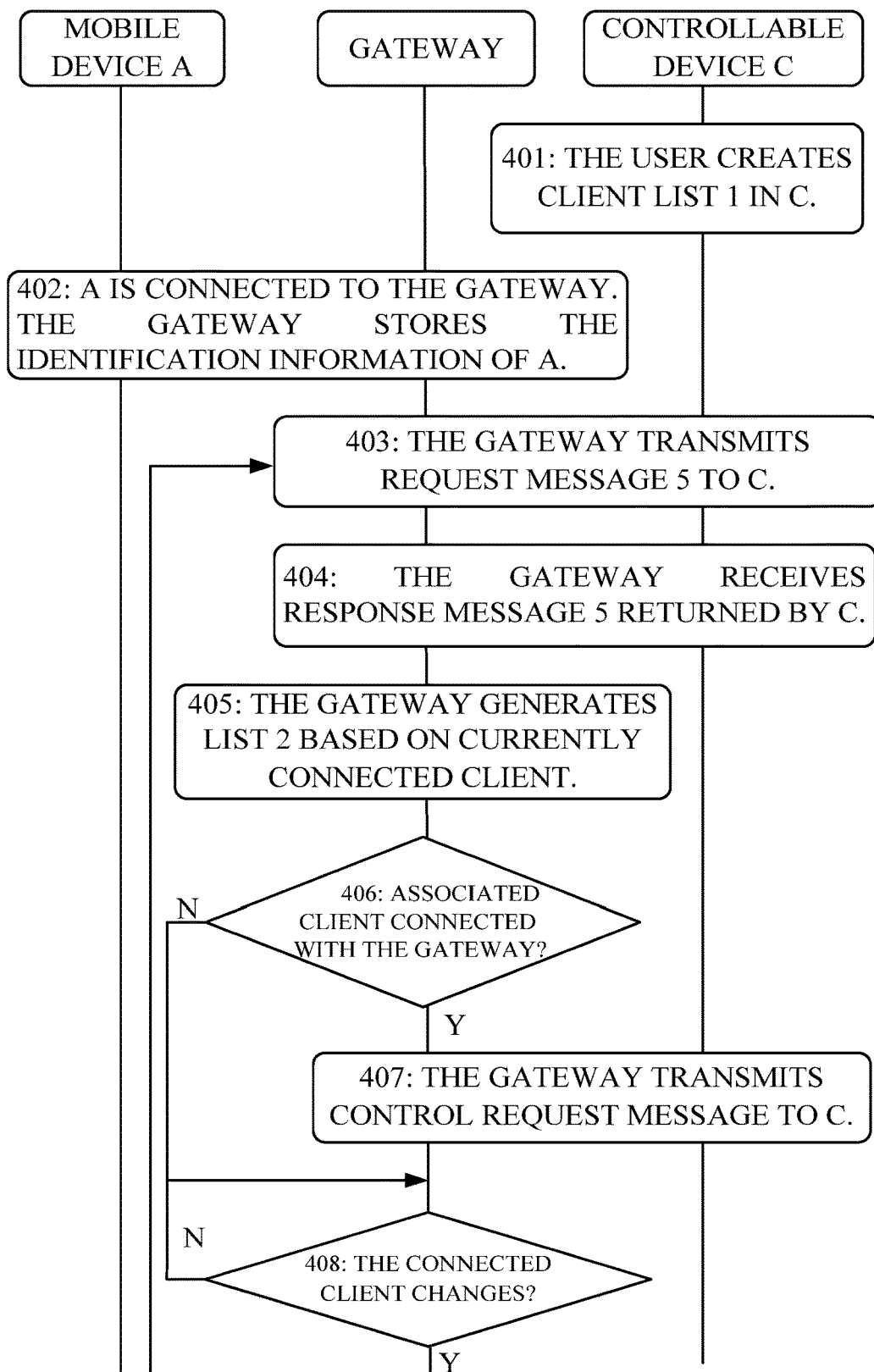
FIG. 4 shows a further example implementation of a method according to an embodiment of this disclosure.

FIG. 4 shows a further example implementation of a method according to an embodiment of this disclosure. In this implementation, similar to FIG. 3, it is assumed that controllable device C is connected to a local area network via a gateway. Controllable device C has an associated client, i.e., a mobile device A, and the gateway is the reference device. In this implementation, the method for controlling the state of the controllable device is also carried out by the gateway. Different from FIG. 3, FIG. 4 shows that client list 1 of the clients associated with the controllable device is created manually by a user in the controllable device, and is maintained by the controllable device itself. Although not shown, it could be understood that in the case of being maintained by the server, client list 1 can also be created manually by the user in the server.

Referring to FIG. 4, the method for controlling the state of controllable device can comprise the following steps.

Step 401: Controllable device C receives a user input for creating client list 1 of clients associated with controllable device C in controllable device C, and setting the associated clients of controllable device C in client list 1. For example, the user adds the identification information of mobile device A in client list 1 so as to set mobile device A as an associated client of controllable device C.

Step 402: When mobile device A reaches the local area network where controllable device C locates, mobile device A is connected to the gateway. The gateway stores the identification information of mobile device A.

Step 403: The gateway transmits request message 5 to controllable device C to request controllable device C to provide client list 1 of the associated client of controllable device C.

Step 404: The gateway receives response message 5 returned by controllable device C, response message 5 may carry client list 1. Client list 1 contains the identification information of mobile device A.

Step 405: The gateway generates client list 2 based on the currently connected clients thereof. Client list 2 contains the identification information of mobile device A.

Step 406: The gateway compares the list 1 with the list 2 so as to determine whether an associated client of controllable device C is connected with it. In this example, since the list 1 and the list 2 both contain the identification information of mobile device A, it may be determined that an associated client of controllable device C is currently connected with the gateway. Thus, at step 407, the gateway can transmit a control request message to controllable device C to request controllable device C to control the state of its controllable component accordingly.

In other cases, if it is another mobile device A' not set by the user reaches the local area network where controllable device C locates at step 402, because mobile device A' is not an associated client of controllable device C, the determination result here at step 406 will indicate that no associated client is connected with the gateway. The gateway can thereby transmit no control request message to controllable device C, and proceed to step 408.

It could be understood that, depending on the control strategy used, the gateway can also transmit no control request message when it is determined that an associated client of controllable device C is currently connected with the gateway, and transmit a control request message when it is determined that no associated client is connected with the gateway.

At step 408: The gateway detects whether an client(s) connected with it changes. If the detection result is "Yes", return to step 403 to repeat the above process of controlling the controllable device. Optionally, considering that the associated client of the controllable device changes at a low frequency, the gateway can also return to step 405 to repeat the above process. If the detection result is "No", the gateway will perform detection of the connected client again after a period of time.

Alternatively or additionally, the gateway can repeat the above process at certain time intervals.

Although in the above example implementation, the reference device is explained by taking the example of the gateway, it could be understood that the method according to an embodiment of this disclosure is also applicable for other reference devices.

Because a gateway has a limited coverage area, the connection between a client and the gateway can indicate the position of the client relative to the gateway in many cases. For example, in a home LAN, when a client is connected with a gateway of the home LAN, it may be inferred that the client has been within the coverage area of the home LAN, i.e., in the vicinity of the gateway.

Figure 5:
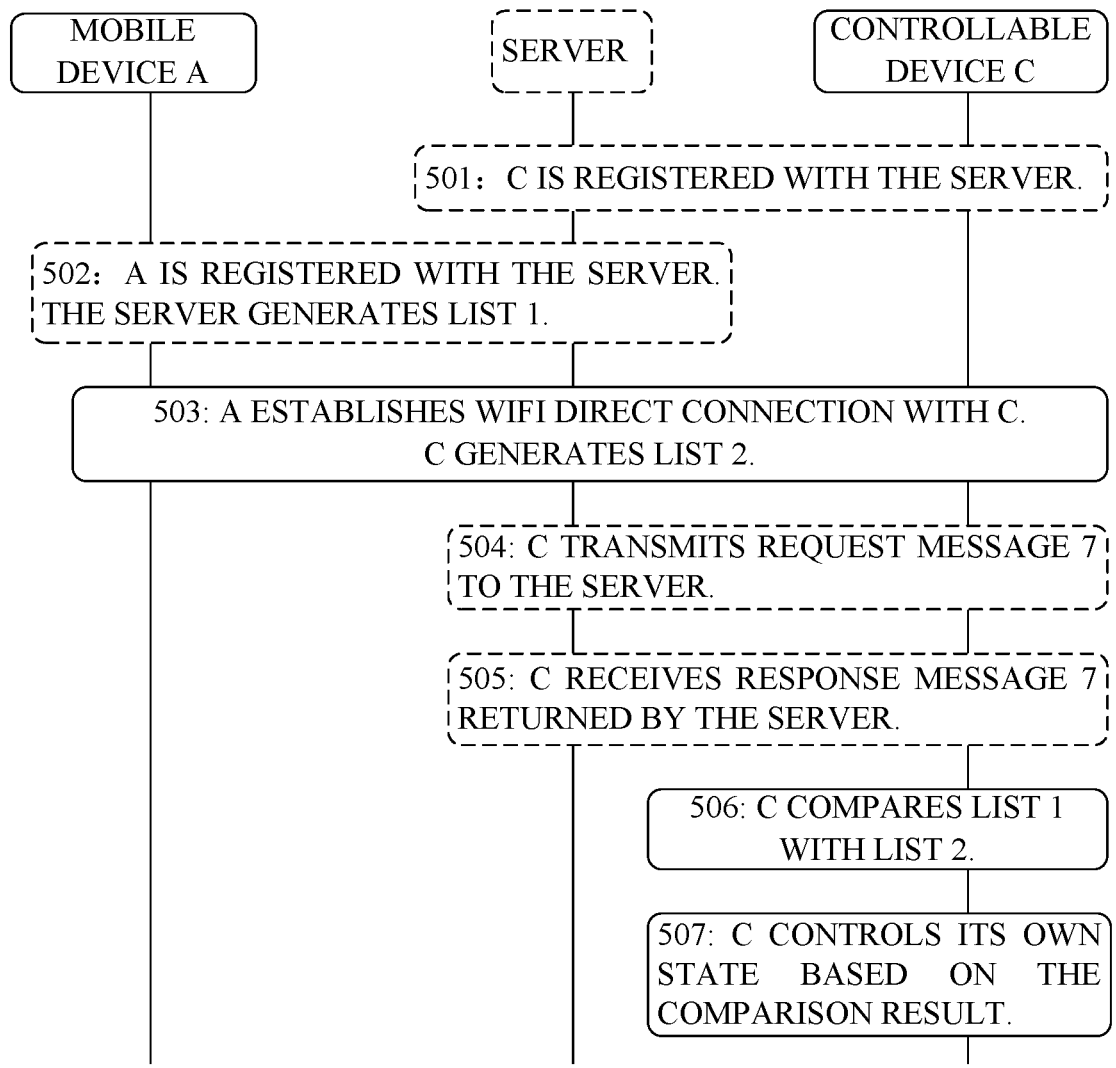
FIG. 5 is yet another example implementation of a method according to an embodiment of this disclosure.

However, such a determination of the position of the client can also be realized in other ways. FIG. 5 shows yet another example implementation of a method according to an embodiment of this disclosure, in which controllable device C is equipped with a short distance peer-to-peer connection functionality, e.g., WIFI Direct connection functionality. It could be understood that when the client is also equipped with the WIFI Direct connection functionality and is connected with the controllable device through WIFI Direct, it can also indicate that the client is in an area relatively close to the controllable device. Different from the solutions in FIG. 3 and FIG. 4, FIG. 5 shows that controllable device C is a reference device.

In this example implementation, the method for controlling the state of the controllable device is carried out by controllable device C.

Referring to FIG. 5, the method for controlling the state of the controllable device can comprise the following steps.

Step 501: Controllable device C is registered with a server. The server can store the identification information of controllable device C. The identification information of controllable device C can include the device name, the MAC address etc.

Step 502: Client list 1 of clients associated with controllable device C is generated in the server. In this example, mobile device A is registered with the server as an associated client of controllable device C. Client list 1 contains the identification information of mobile device A.

Alternatively, when client list 1 of clients associated with controllable device C is generated and maintained in the controllable device, steps 501 and 502 may be omitted.

Step 503: When mobile device A reaches the vicinity of controllable device C, mobile device A establishes WIFI Direct connection with controllable device C. Controllable device C stores the identification information of mobile device A and accordingly generates client list 2. Client list 2 contains the identification information of mobile device A. In some embodiments, controllable device C forms client list 2 based on the client that currently establishes WIFI Direct connection with it.

Step 504: Controllable device C transmits request message 7 to the server to request the server to provide the list 1 of the associated clients of controllable device C.

Step 505: Controllable device C receives response message 7 returned by the server. The response message 7 may carry the list 1.

In some embodiments, client list 1 may be generated after the server receives the request message, and client list 2 may be generated at the same time or after the request message is transmitted.

In some embodiments, when client list 1 is generated and maintained by controllable device C, the steps 504 and 505 may be omitted.

Step 506: Controllable device C compares the list 1 with the list 2 so as to determine whether the associated client is connected with the reference device.

Step 507: Controllable device C controls its own state based on the comparison result. For example, when the comparison result indicates that an associated client of controllable device C is connected with controllable device C, controllable device C can control its state accordingly, e.g., changing its own working mode.

With the method for controlling the state of the controllable device according to an embodiment of this disclosure, automatic control of the controllable device can be achieved by controlling the state of the controllable device based on the state of the connection between an associated client of the controllable device and the reference device, which avoids manual control and improves user experience.

Figure 6:
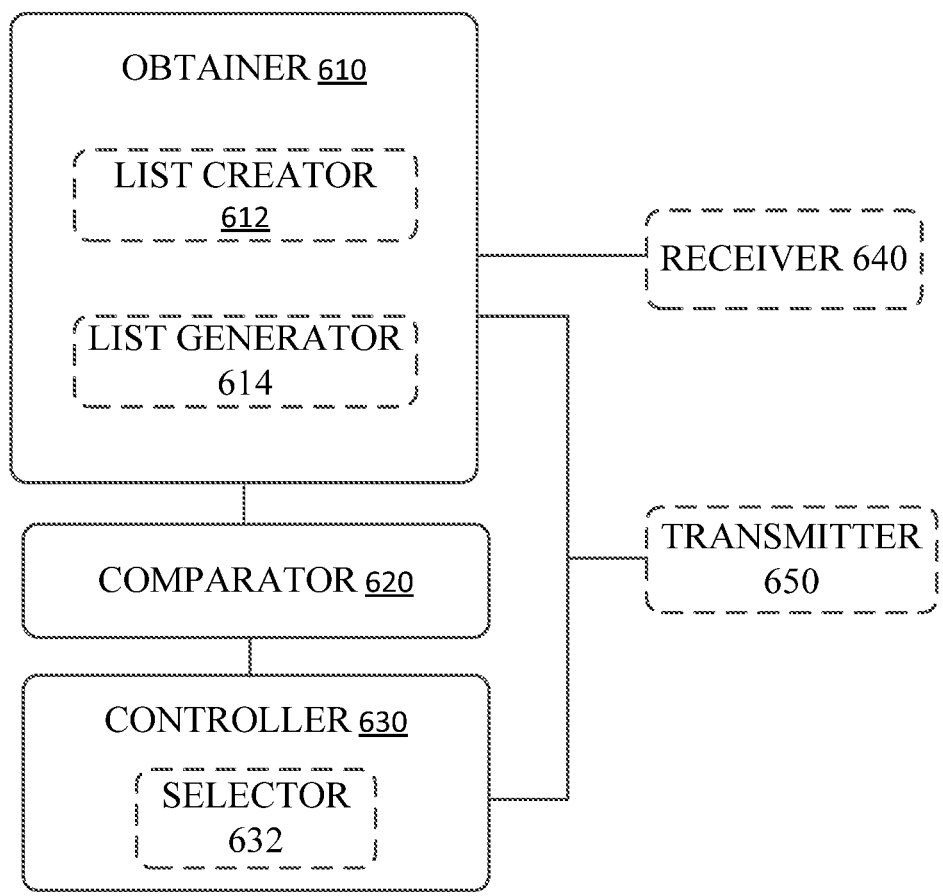
FIG. 6 shows a structural schematic view of an apparatus for controlling a state of a controllable device according to an embodiment of this disclosure.

FIG. 6 shows an apparatus 600 for controlling a state of a controllable device according to an embodiment of this disclosure. The controllable device associates with at least one associated client and a reference device. The apparatus 600 comprises: an obtainer 610, a comparator 620 and a controller 630.

The obtainer 610 is used for obtaining a first client list of the at least one associated client(s) and a second client list of client(s) connected with the reference device.

The comparator 620 is used for comparing the first client list with the second client list so as to determine whether any of the at least one associated client is connected with the reference device.

The controller 630 is used for controlling the state of the controllable device based on the comparison result.

In an embodiment of this disclosure, the controller 630 can control the state of a controllable component of the controllable device, for example the state of a mechanical structure and/or the working mode of an electronic component, based on the comparison result.

According to an embodiment of this disclosure, the apparatus 600 may further comprise: a transmitter 640 and a receiver 650.

In some embodiments, the first client list is maintained by the server. The obtainer 610 is configured to instruct the transmitter 640 to transmit a first request message to the server to request the server to provide the first client list, and obtain the first client list from a first response message received by the receiver 650, which carries the first client list and is returned by the server.

In some embodiments, the second client list is maintained by the reference device. The obtainer 610 is configured to instruct the transmitter 640 to transmit a second request message to the reference device to request the reference device to provide the second client list, and obtain the second client list from a second response message received by the receiver 650, which carries the second client list and is returned by the reference device.

In some embodiments, the obtainer 610 can further comprise a list creator 612 and/or a list generator 614. The list creator 612 is configured to create the first client list based on a client registered with the server as being associated with the controllable device, and/or, create the first client list based on a user input and include the associated client of the controllable device therein. The list generator 614 is configured to generate the second client list based on a client currently connected to the reference device.

In some embodiments, the first client list and the second client list contain the identification information of the clients. The comparator 620 is configured to match the identification information of the clients in the first and second client lists and output corresponding connection information. For example, if there are one or more pairs of matched client identification information, the comparator 620 will determine that one or more associated clients of the controllable device have been connected to the reference device, and then output a corresponding indication indicative of being connected. However, if there is no any matching, the comparator 620 will determine that no associated client is connected with the reference device currently, and then output a corresponding indication indicative of being unconnected. Optionally, the connection information outputted by the comparator 620 can also contain indications of other clients connected with it, for instance, a piece of connection information being output may be: an associated client A and an unassociated client B are connected, etc.

In some embodiments, the controller 630 generates a corresponding control request message based on the comparison result, and instructs the transmitter 640 to transmit the control request message to the controllable device so as to control its state, optionally, a state of its controllable component.

In an example implementation, the controllable device accesses a communication network through a network access device and the network access device is the reference device. In one embodiment, the network access device may be a gateway, e.g., a gateway of a LAN.

According to an embodiment of this disclosure, a controllable device is further provided, comprising the apparatus for controlling the state of the controllable device as stated above.

Additionally or alternatively, in some embodiments, the first client list is created and maintained in the controllable device. Thus, the obtainer 610 of the controllable device comprises: a list creator 612 for creating the first client list by receiving a user input so as to obtain the list.

Additionally or alternatively, in some embodiments, the controllable device further comprises a short distance peer-to-peer connection (e.g., WIFI Direct, Bluetooth etc.) module, and is the reference device. At this point, the obtainer of the controllable device further comprises: a list generator 614 being configured to generate the second client list based on the identification information of a client that establishes a short distance peer-to-peer connection with it currently so as to obtain the list.

According to an embodiment of this disclosure, a network access device is further provided, comprising the apparatus for controlling the state of the controllable device as stated above.

In some embodiments, the network access device is the reference device of the controllable device. In such embodiments, the obtainer of the network access device is configured to instruct the transmitter 640 to transmit a request message to the controllable device to request the controllable device to provide the first client list, and obtain the first client list from a third response message received from the receiver 650, which carries the first client list and is returned by the controllable device. The obtainer of the network access device can further comprise a list generator 614 being configured to generate the second client list based on the identification information of a client that establishes a short distance peer-to-peer connection with it currently.

Optionally, the first client list is obtained from the server after the controllable device receives the request message.

In some embodiments, the controller 630 of the network access device can comprise a selector 632 being configured to select a control instruction based on the comparison result. The controller is further configured to instruct the transmitter to transmit a control request message carrying the control instruction to the controllable device, so as to instruct the controllable device to execute the control instruction.

The first client list may be generated by the server and/or created by a user of the controllable device. The server can create the first client list based on one or more clients registered with it. Alternatively or additionally, the user of the controllable device can create the first client list according to his/her own requirement and add therein one or more clients associated with the controllable device.

With the apparatus for controlling the state of the controllable device, the controllable device and the network access device in embodiments of this disclosure, automatic control of the controllable device can be achieved by controlling the state of the controllable device based on the state of the connection between the associated client of the controllable device and the reference device, which avoids manual control and improves user experience.

Figure 7:
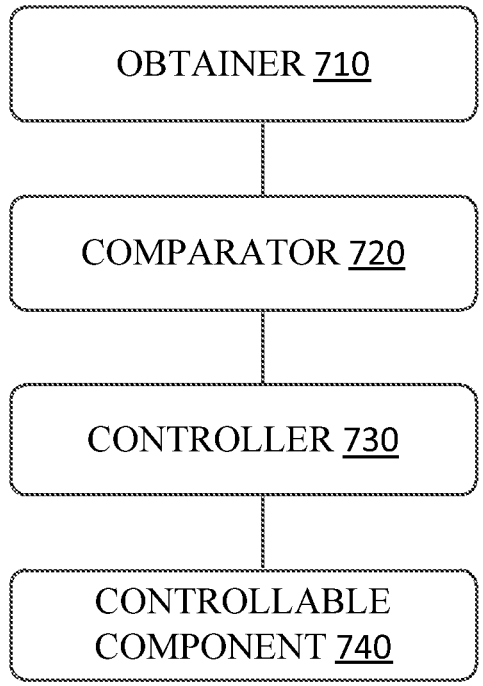
FIG. 7 shows a structural schematic view of a controllable device according to an embodiment of this disclosure.

FIG. 7 shows a structural schematic view of a controllable device 700 according to an embodiment of this disclosure. The controllable device 700 associates with at least one associated client and a reference device. The controllable device 700 can comprise an apparatus for controlling its state. As shown in FIG. 7, the controllable device 700 comprises: an obtainer 710, a comparator 720, a controller 730 and a controllable component 740.

The obtainer 710 is used for obtaining a first client list of the at least one associated client and a second client list of clients connected with the reference device. The comparator 720 is used for comparing the first client list with the second client list so as to determine whether any of the at least one associated clients is connected with the reference device. The controller 730 is used for controlling the state of the controllable component 740, and then controlling the state of the controllable device 700, based on the comparison result.

It could be recognized that the obtainer 710, the comparator 720 and the controller 730 can perform actions similar to the corresponding components as shown in FIG. 6.

It could be understood that although not shown in FIG. 7, the controllable device 700 can further comprise other various suitable components, including but not limited to the list creator for creating the first client list, the list generator for generating the second client list, the transmitter for transmitting the request message, the receiver for receiving the response message and the like as shown in FIG. 6.

Figure 8:
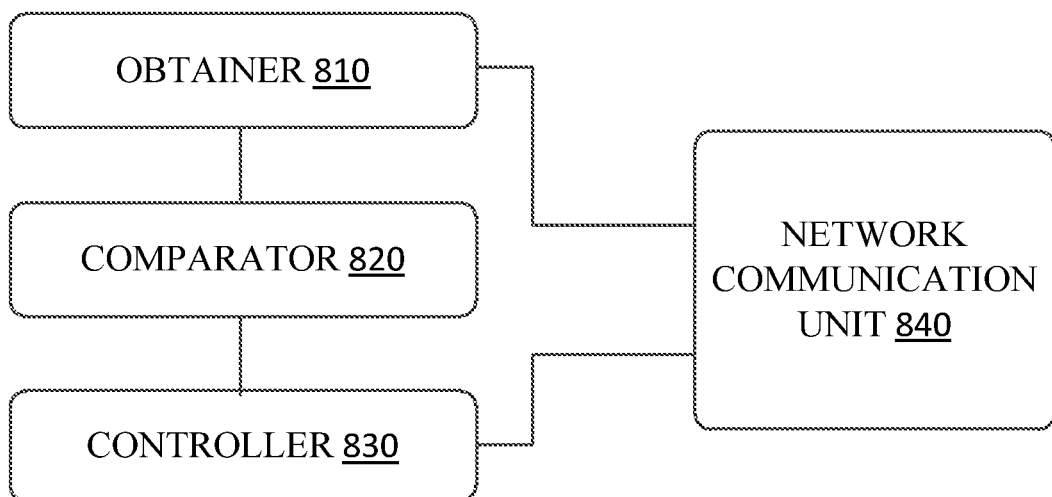
FIG. 8 shows a structural schematic view of a network access device according to an embodiment of this disclosure.

FIG. 8 shows a structural schematic view of a network access device 800 according to an embodiment of this disclosure. The network access device 800 can comprise the apparatus for controlling the state of the controllable device according to the present disclosure. As shown in FIG. 8, the network access device 800 comprises: an obtainer 810, a comparator 820, a controller 830 and a network communication unit 840.

The obtainer 810 is used for obtaining a first client list of associated clients of the controllable device and a second client list of clients connected with the network access device. The comparator 820 is used for comparing the first client list with the second client list so as to determine whether any of the associated clients is connected with the network access device. The controller 830 is used for controlling the state of the controllable device based on the comparison result.

Here, the obtainer 810 obtains the first client list via the network communication unit 840. The controller 830 controls the state of the controllable device by transmitting a control message to the controllable device via the network communication unit 840.

It could be recognized that the obtainer 810, the comparator 820 and the controller 830 can perform actions similar to the corresponding components as shown in FIG. 6.

It could be understood that although not shown in FIG. 8, the network access device 800 can further comprise other various suitable components, including but not limited to the list generator for generating the second client list, the transmitter for transmitting the request message, the receiver for receiving the response message and the like as shown in FIG. 6.

Figure 9:
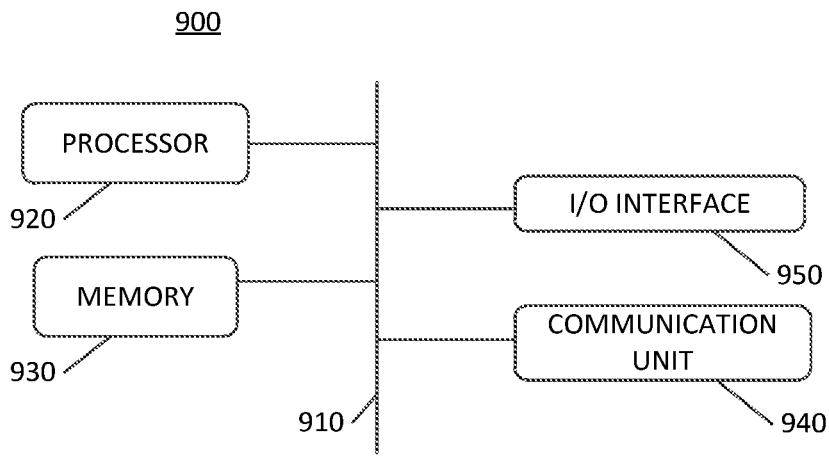
FIG. 9 shows a schematic view of an exemplary computing device adapted to implement an embodiment of this disclosure.

FIG. 9 shows an embodiment of an exemplary computing device 900 applicable for implementing various embodiments as stated above. The computing device 900 comprises various common computing units, such as one or more processors, coprocessors, memory units, chip sets, controllers, peripherals, interfaces, oscillators, timing devices, video cards, audio cards, voltage stabilizers and power management circuits etc.

The computing device 900 comprises a bus 910, a processor 920 and a memory 930.

In FIG. 9, the bus 910 provides an interface use for system components, including but not limited to, an interface from the memory 930 to the processor 920. The bus 910 may be any bus structure in several types of bus structures. The bus 910 can also interconnect various other circuits such as the peripherals, the voltage stabilizers and the power management circuits (not shown) together.

The processor 920 is used for executing tasks such as data processing, input/output processing and/or other functions. The processor 920 may be any of the various processors that may be available in the market. Optionally, the processor 920 may be CPU, ASIC, FPGA or CPLD etc.

The memory 930 provides volatile and/or nonvolatile storage of data, data structures, computer executable instructions and the like. The memory 930 can include a nonvolatile and/or volatile memory.

The computing device 900 further comprises a communication unit 940 being configured to perform wired and/or wireless communication with other devices under the control of the processor 920.

The communication unit 940 may include a transmitter, a receiver, a transceiver, a radio device, a network interface, a baseband processor, an antenna etc. The communication unit 940 may be a single integrated unit, and can also be a plurality of discrete units. In an example, the communication unit 940 is configured to receive external data from other devices in a wireless communication manner, and transmit the data processed by the processor 920 to the other devices.

Optionally, depending on the property of the computing system, the computing device 900 can also provide an input/output interface 950, e.g., a keypad, a display, a loudspeaker, a microphone, an operating lever.

According to an embodiment of this disclosure, the computing device 900 may be configured to store in the memory 930 a computer program that can be run on the processor 920, wherein the processor 920 when executing the program implements the steps of the method for controlling the controllable device according to an embodiment of this disclosure.

According to an embodiment of this disclosure, the computing device 900 may be configured to implement the apparatus for controlling the state of the controllable device, the controllable device and the network access device according to embodiments of this disclosure.

Figure 10:
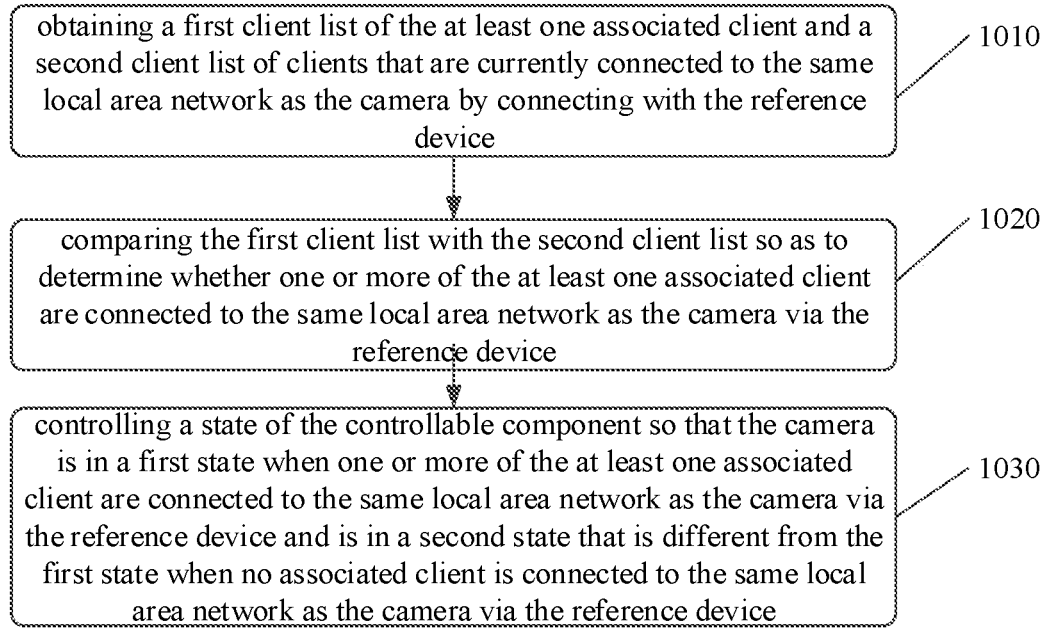
FIG. 10 shows a flow chart of a method for controlling a camera according to an embodiment of this disclosure.

According to an embodiment of the present disclosure, as described with reference to the embodiment of FIG. 1, the controllable device may be a camera. The camera comprises a controllable component and associates with at least one associated client and a reference device. The reference device is a gateway of a local area network to which the camera is connected. As described with reference to FIG. 1, in this case, the method of controlling the camera comprises the steps as shown in FIG. 10. At step 1010, a first client list of the at least one associated client and a second client list of clients that are currently connected to the same local area network as the camera by connecting with the reference device are obtained. At step 1020, the first client list is compared with the second client list to determine whether one or more of the at least one associated client are connected to the same local area network as the camera via the reference device. At step 1030, a state of the controllable component is controlled so that the camera is in a first state when one or more of the at least one associated client are connected to the same local area network as the camera via the reference device and is in a second state that is different from the first state when no associated client is connected to the same local area network as the camera via the reference device.

Figure 11A:
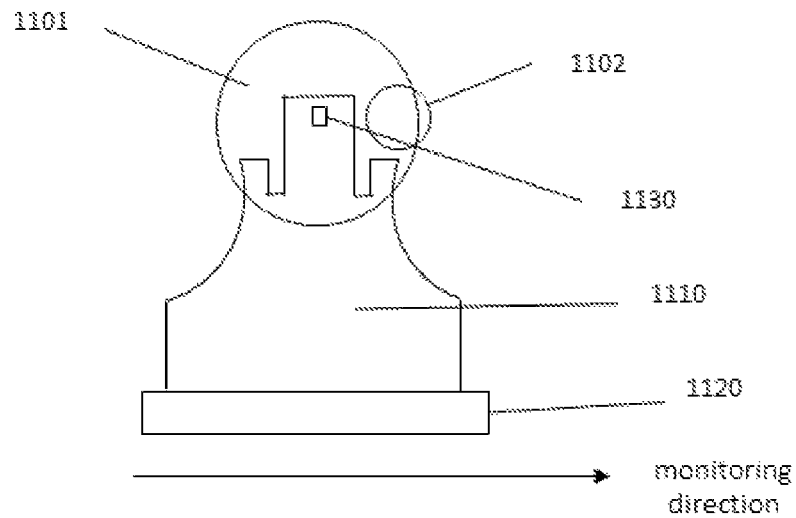
FIGS. 11A-11C show schematic diagrams of the states of a camera according to an embodiment of the present disclosure.
Figure 11B:
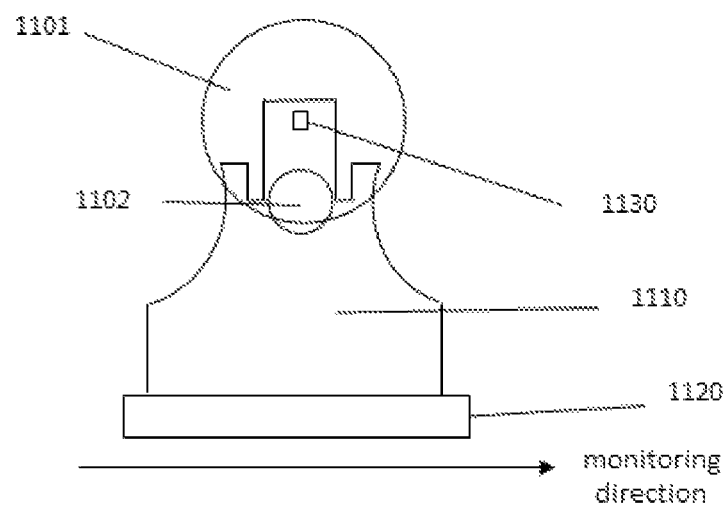
Figure 11C:
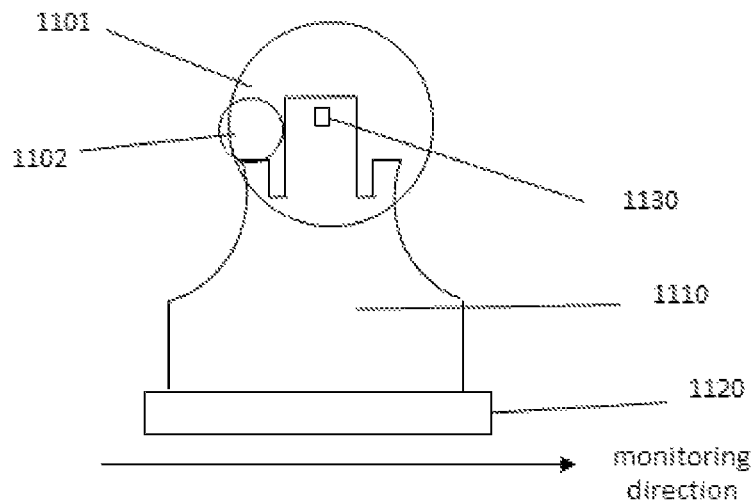

FIGS. 11A-11C show schematic diagrams of the states of a camera according to an embodiment of the present disclosure. In some embodiments, as shown in FIGS. 11A-11C, the camera 1100 includes a camera head 1101 as a controllable component. The camera head includes a lens 1102 configured to capture an image of a target object. In this case, when controlling the state of the controllable component, a rotation angle of the camera head 1101 can be controlled to adjust the direction in which the lens 1102 captures an image, so that in one state of the first state and the second state, the direction in which the lens captures the image is far away from an area where the target object is located (i.e. the lens cannot capture the image of the target object), and in the other state of the first state and the second state, the direction in which the lens captures the image faces the area where the target object is located (i.e. the lens can capture the image of the target object). It should be noted that the direction in which the lens captures the image can also be understood as a monitoring direction or a direction from the lens to the monitoring area where the target object is located. In addition, the structure of the camera is not limited. For example, the camera may further include one or more of a supporting component 1100, a base 1120, and a supporting hole 1130. The supporting component 1110 supports the camera head on the base 1120, and the camera head is fixed to the supporting component 1110 through the supporting hole 1130.

As an example, when controlling the state of the controllable component, the rotation angle of the camera head 1101 may be controlled to adjust the direction in which the lens 1102 captures an image, so that in the first state, the direction in which the lens captures the image is far away from an area where the target object is located (as shown in FIGS. 11B and 11C, where the direction of the lens capturing the image is adjusted to the downward and leftward respectively to be away from the rightward monitoring direction, so as to start the privacy protection mode), and in the second state, the direction in which the lens captures the image faces the area where the target object is located (as shown in FIG. 11A, the direction of the image captured by the lens is adjusted to be the rightward monitoring direction, thereby starting the non-privacy protection mode (or monitoring mode). That is, when one or more of the at least one associated client are connected to the same local area network as the camera via the reference device, the direction in which the lens captures the image is away from the area where the target object is located, and when no associated client is connected to the same local area network as the camera via the reference device, the direction in which the lens captures the image faces the area where the target object is located.

Figure 12A:
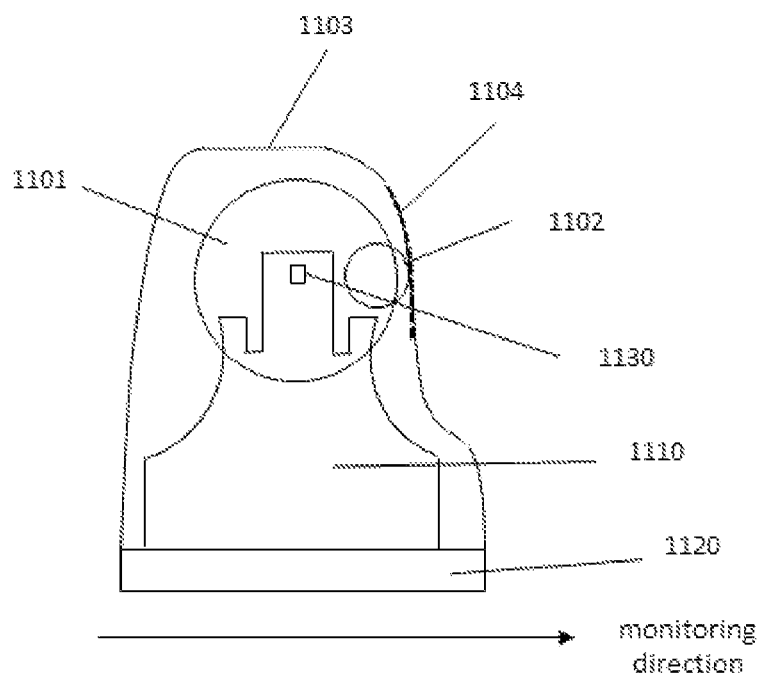
FIGS. 12A-12C show schematic diagrams of the states of a camera according to an embodiment of the present disclosure.
Figure 12B:
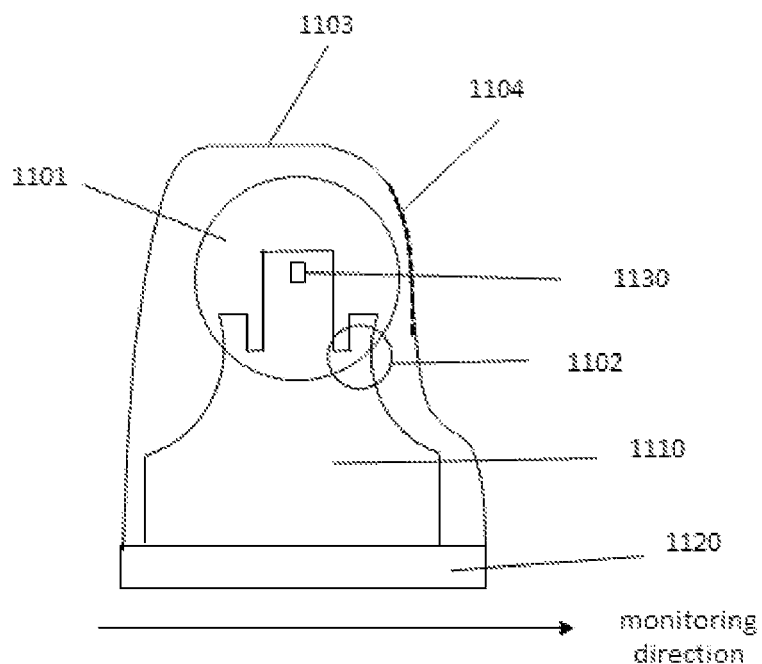
Figure 12C:
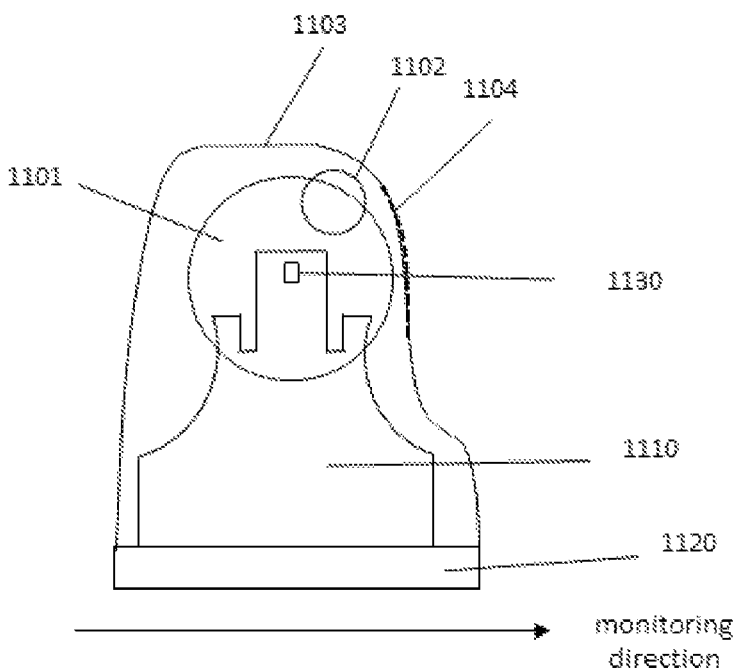

FIGS. 12A-12C show schematic diagrams of the states of a camera according to an embodiment of the present disclosure. In some embodiments, as shown in FIGS. 12A-12C, in addition to the camera head 1101 mentioned in FIGS. 11A-11C, the controllable component of the camera also includes a hollow housing 1103 which is opaque. The hollow housing has a first opening 1104, the camera head is arranged in the hollow housing, and the first opening faces the area where the target object is located (i.e. the monitoring direction). The hollow housing is opaque, so that the lens is prevented from capturing images through the wall of the hollow housing. In this case, when controlling the state of the controllable component, the rotation angle of the camera head can be controlled to adjust the direction in which the lens captures the image, so that in the one state of the first state and the second state, the direction in which the lens captures the image is away from the first opening, and in the other state of the first state and the second state, the direction in which the lens captures the image faces the first opening so that the direction faces the area where the target object is located.

As an example, when controlling the state of the controllable component, the rotation angle of the camera head 1101 may be controlled to adjust the direction in which the lens 1102 captures the image, so that in the first state, the direction in which the lens captures the image is away from the first opening (as shown in FIGS. 12B and 12C, where the direction of the lens capturing the image is adjusted to the lower right and upper right, respectively, so that the lens is blocked by the housing, thereby starting the privacy protection mode), and in the second state, the direction in which the lens captures the image faces the first opening so that the direction faces the area where the target object is located (as shown in FIG. 12A, where the direction in which the lens captures the image is adjusted to face the first opening, thereby starting the non-privacy protection mode or monitoring mode).

Figure 13A:
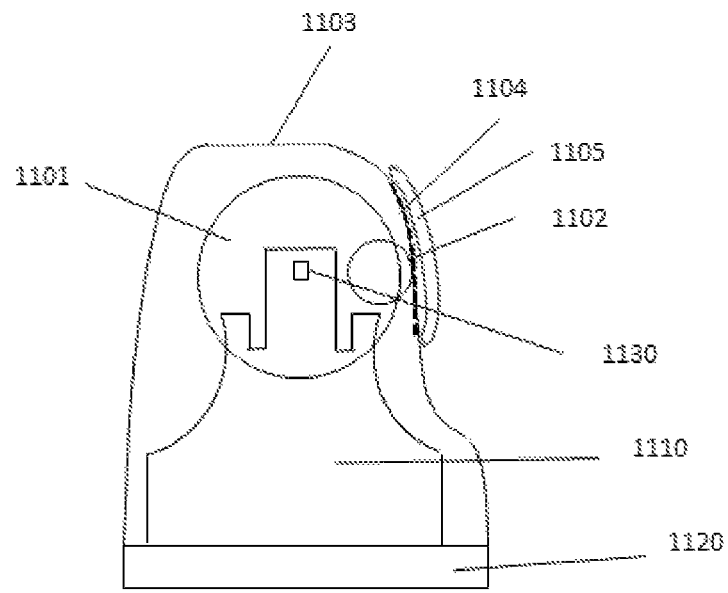
FIGS. 13A and 13B show schematic diagrams of the states of a camera according to an embodiment of the present disclosure.
Figure 13B:
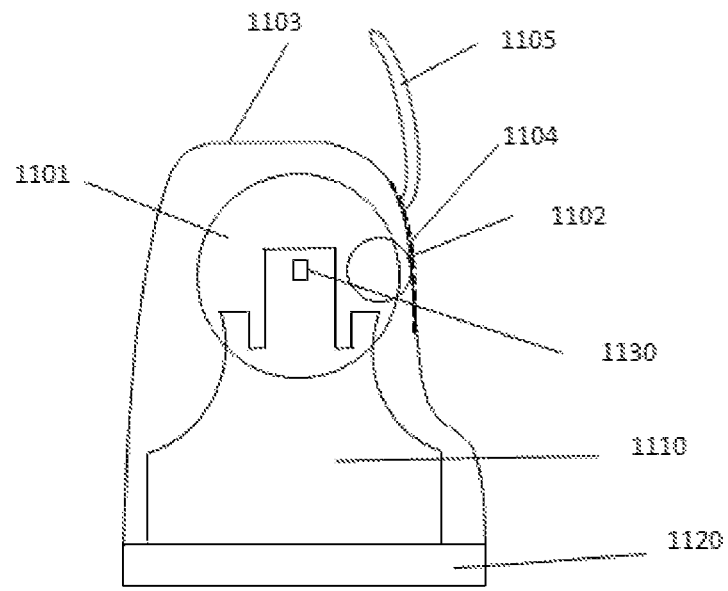

FIGS. 13A and 13B show schematic diagrams of the states of a camera according to an embodiment of the present disclosure. In some embodiments, as shown in FIGS. 13A and 13B, on the basis of the structure shown in FIGS. 12A-12C, the controllable component of the camera further includes a lens cover 1105 adapted to the first opening 1104, and the direction in which the lens 1102 captures the image faces the first opening 1104. In this case, when controlling the state of the controllable component, a positioning of the lens cover can be controlled so that in the one state of the first state and the second state, the lens cover closes the first opening (i.e. the lens cannot capture the image of the target object), and in the other state of the first state and the second state, the lens cover leaves the first opening so as to open the first opening (i.e. the lens can captures the image through the first opening). In some embodiments, the positioning of the lens cover can be controlled so that in the one state of the first state and the second state and under the condition that the lens has captured the target image, the lens cover closes the first opening.

As an example, when controlling the state of the controllable component, the positioning of the lens cover can be controlled so that in the first state, the lens cover closes the first opening (as shown in FIG. 13A), and in the second state, the lens cover leaves the first opening to open the first opening (as shown in FIG. 13B). Optionally, the first opening is closed by the lens cover only the conditions that the target image is captured by the lens and the camera is in the first state are satisfied at the same time.

FIGS. 14A-14F show schematic diagrams of the states of a camera according to an embodiment of the present disclosure. In some embodiments, as shown in FIGS. 14A-14D, the structure of the camera is similar to that shown in FIGS. 12A-12C. The camera includes a camera head 1101, and the camera head includes a lens 1102 configured to capture an image of a target object. The camera further includes a hollow housing 1103 which is opaque. The hollow housing have a first opening 1104 and a second opening 1106. The camera head is arranged in the hollow housing, and the first opening faces the area where the target object is located (that is, the monitored area). In this case, when controlling the state of the controllable component, the camera head 1101 can be controlled so that in the one state of the first state and the second state, the camera head protrudes out of the hollow housing through the second opening, and in the other state of the first state and the second state, the camera head is located in the hollow housing and the direction in which the lens captures the image faces the first opening.

Figure 14A:
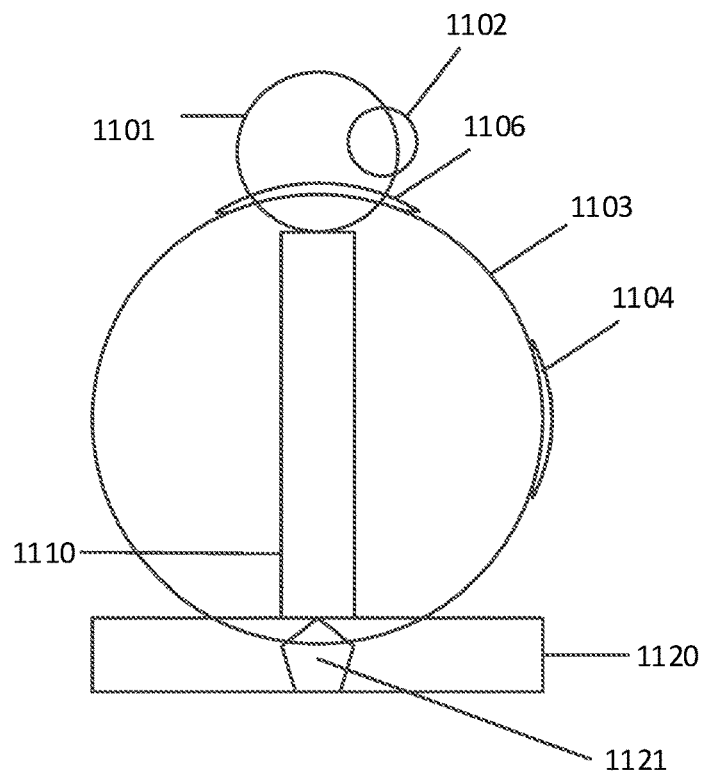
FIGS. 14A-14F show schematic diagrams of the states of a camera according to an embodiment of the present disclosure.
Figure 14B:
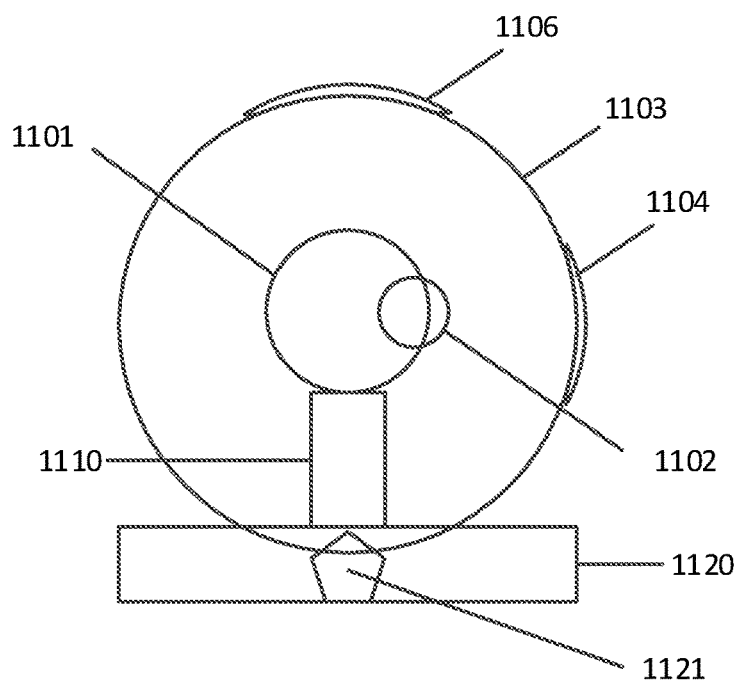
Figure 14C:
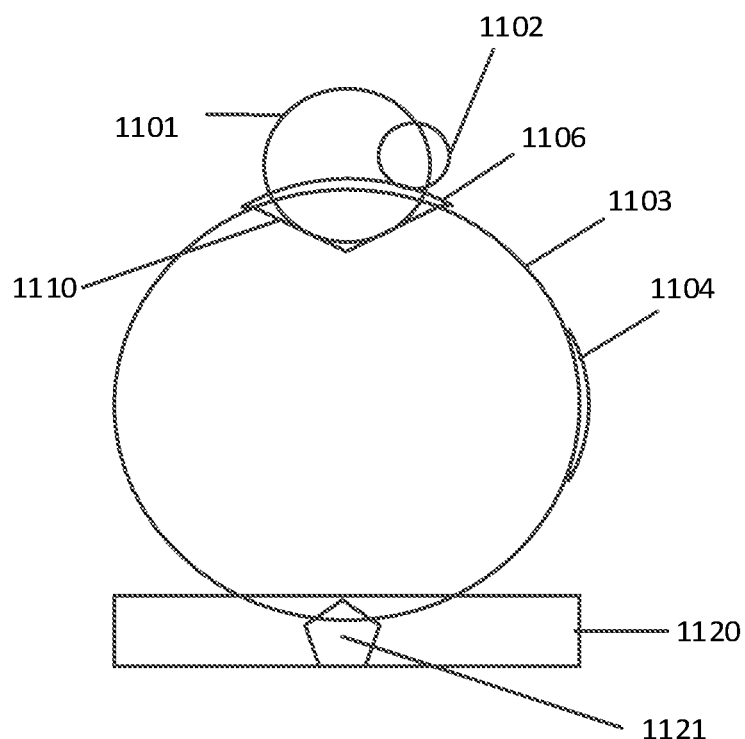
Figure 14D:
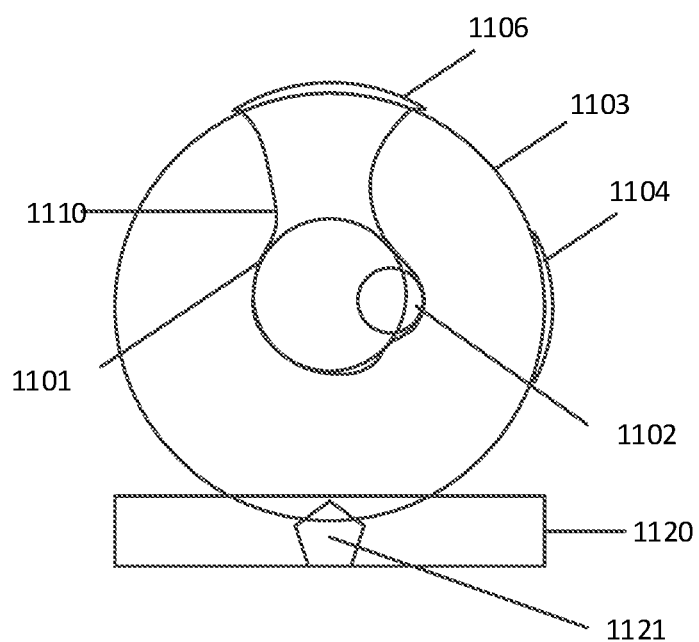

As an example, when controlling the state of the controllable component, the camera head 1101 can be controlled so that the camera head 1101 protrudes out of the hollow housing through the second opening 1106 in the first state (in this case, the camera has a better bionic structure and is more friendly to the target object or user) as shown in FIGS. 14A and 14C, and in the second state, the camera head is located in the hollow housing and the direction in which the lens captures the image faces the first opening (in this case, the camera head has a better concealment effect and has less impact on the monitored target object), as shown in FIGS. 14B and 14D. It should be noted that the camera head protruding out of the hollow housing may include the entire camera head being outside the hollow housing, or the camera head being partly outside the hollow housing.

In some embodiments, the controllable component further includes a supporting component 1110, a base 1120, and a base motor 1121. The camera head is connected to the base via the supporting component. When the camera head is controlled, a height of the camera head relative to the base can be controlled via the supporting component. In some embodiments, the supporting component may include a spiral component (e.g., screws, etc.) as shown in FIGS. 14A and 14B, or may include an inflatable component (e.g., inflatable airbag, etc.) as shown in FIGS. 14C and 14D.

In some embodiments, when controlling the state of the controllable component, a length of the camera head protruding from the second opening may be controlled, for example, according to a preset user preference. In addition, the top (that is, the part close to the camera head) of the supporting component may be composed of an elastic material, so that it can support the shaking of the camera head while supporting the camera head.

Figure 14E:
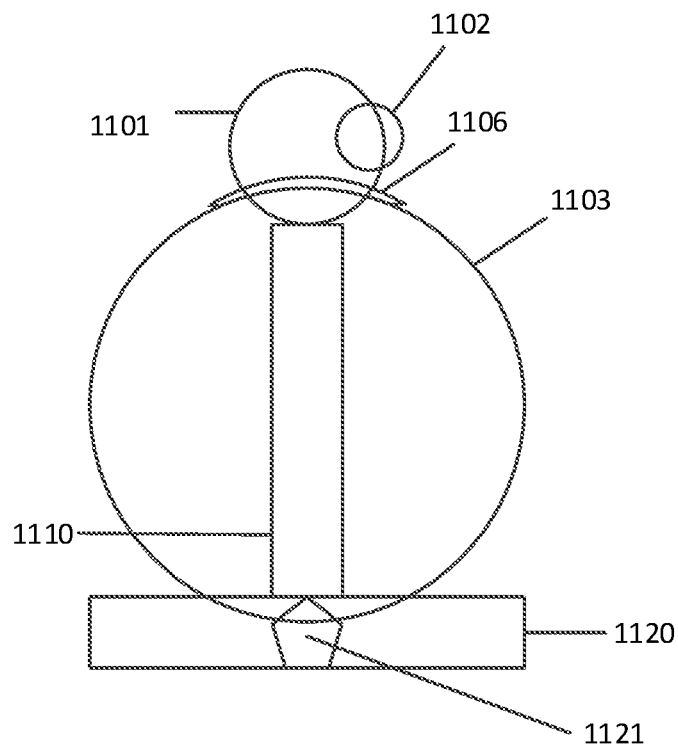
Figure 14F:
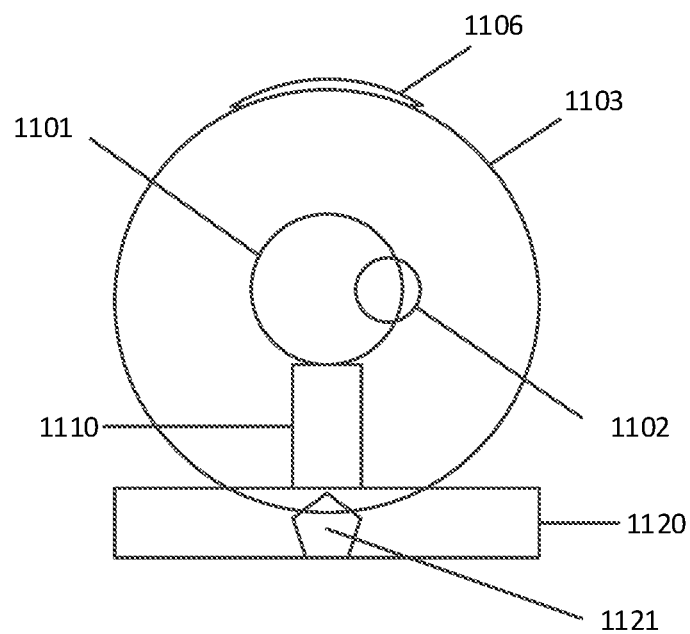

In some embodiments, the hollow housing may have only the second opening 1106 and not have the first opening 1104, as shown in FIGS. 14E and 14F. In this case, when controlling the state of the controllable component, the camera head 1101 can be controlled so that in the one state of the first state and the second state, the camera head protrudes out of the hollow housing through the second opening (and optionally, the direction of the lens capturing image is enabled to face the area where the target object is located), and in the other state of the first state and the second state, the camera head is located in the hollow housing.

Figure 15A:
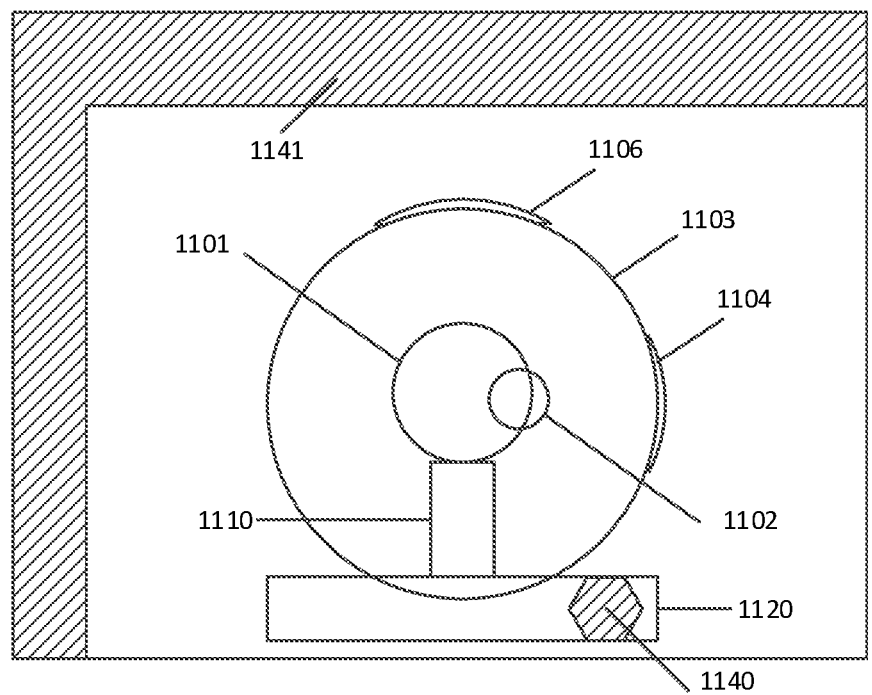
FIGS. 15A-15B show schematic diagrams of the states of a camera according to an embodiment of the present disclosure.
Figure 15B:
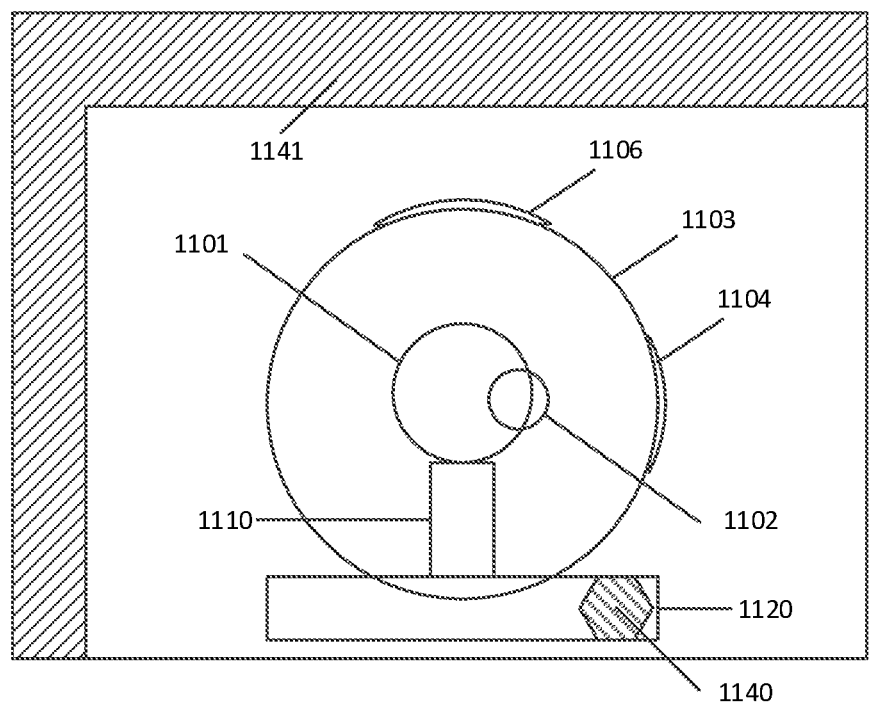

FIGS. 15A-15B show schematic diagrams of the states of a camera according to an embodiment of the present disclosure. As shown in FIGS. 15A-15B, the controllable component of the camera may further include a color changing component 1140. In this case, when controlling the state of the controllable component, the color of the color changing component can be controlled so that the color of the color changing component in the first state is the first color (for example, the color of the camera thus is the first color (e.g. red), as shown by 1140 in FIG. 15A where different directions of the diagonal lines represents different colors), and the color of the color changing component in the second state is the second color (for example, the color of the camera thus is the second color (e.g. blue) as shown by 1140 in FIG. 15B where different directions of the diagonal lines represents different colors). It should be noted that FIGS. 15A and 15B show structures similar to those of the above-described camera, which additionally includes a color changing component as a controllable component. However, this is not restrictive, and the camera can adopt different structures.

In some embodiments, the colors of the color changing component in the first state and the second state can be controlled according to the user's color preference. In some embodiments, when controlling the state of the controllable component, the color of the color changing component can be controlled so that the color of the color changing component in the one state of the first state and the second state is different from the color of the wall 1141 of the environment where the camera is located, and the color of the color changing component in the other state of the first state and the second state is the same as the color of the wall 1141 of the environment where the camera is located.

Figure 16A:
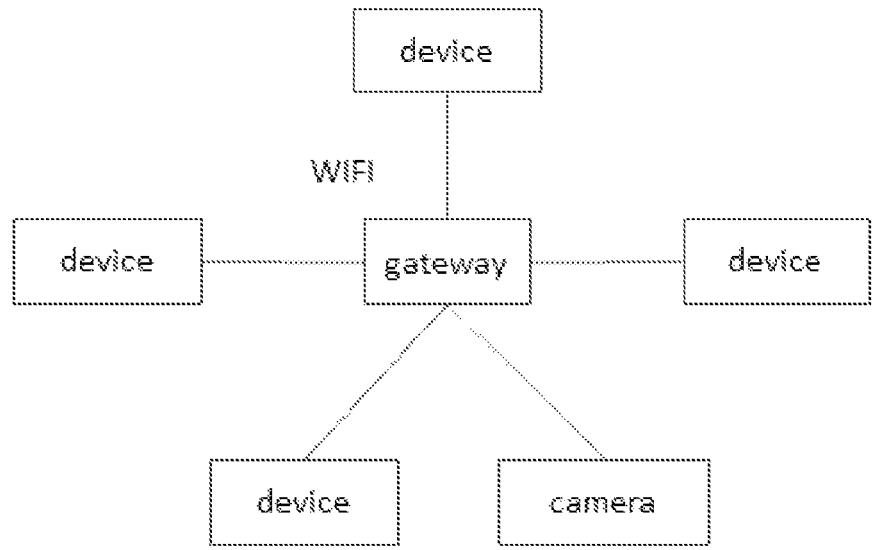
FIGS. 16A-16B show schematic diagrams of the states of a camera according to an embodiment of the present disclosure.
Figure 16B:
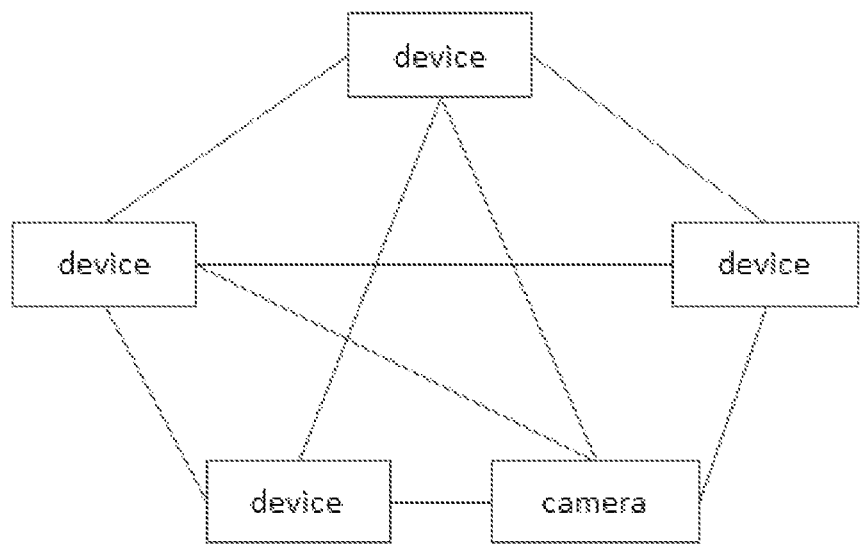

FIGS. 16A-16B show schematic diagrams of the states of a camera according to an embodiment of the present disclosure. In some embodiments, the controllable component includes a network module, and the network module has or can adopt a plurality of networking modes. When controlling the state of the controllable component, the network module can be controlled, so that in the first state, the network module adopts the first networking mode of the plurality of networking modes, and in the second state, the network module adopts the second networking mode of the plurality of networking modes.

As an example, the first networking mode can be a MESH networking mode, and the second networking mode can be a star networking mode. In the star networking mode, the camera can use the network module to connect to the gateway (for example, through a WIFI interface), in order to construct a star network as shown in FIG. 16A. In the MESH networking mode, the camera can use the network module to connect to other devices (for example, through a Bluetooth interface) to construct a MESH network, as shown in FIG. 16B. The devices in FIGS. 16A and 16B represent any devices participating in the networking, and they are not limited.

In the first networking mode, the camera can start the local MESH network. Specifically, the camera (specifically, the network module of the camera) searches for local devices (e.g. clients or mobile terminals) through a protocol such as Bluetooth or Zigbee, and establishes a local MESH network with the local devices. In the second networking mode, the camera connects to the gateway to construct a star network, starts a WAN (wide area network) connection through the gateway, and then can receive the connection request sent by another device (a client or a mobile terminal) through the WAN.

Optionally, after the camera starts the second networking mode, the first networking mode is closed, and the another device sends a control or query request to the camera through the network constructed in the second networking mode, and the camera returns a control or query response to the another device through the network. Optionally, when the camera starts the second networking mode, the camera can initiate a networking request or apply to join an already constructed network.

Optionally, taking the mesh networking mode as an example, the camera obtains a connection mode of said another device. If said another device has turned on a WIFI MESH function, the camera will start the WIFI MESH networking mode. If said another device has turned on a Bluetooth MESH function, the camera will start a Bluetooth MESH function. When said another device has simultaneously turned on the WIFI MESH and Bluetooth MESH functions, the camera selects one of the WIFI MESH function and Bluetooth MESH function according to a selection strategy. The following table shows an introduction of these two MESH function.

| selection strategy | WIFI MESH | Bluetooth MESH |
| --- | --- | --- |
| network speed | fast | slow |
| number of network devices | number of devices that support WIFI MESH | number of devices that support Bluetooth MESH |
| network power consumption | high | low |

Optionally, the structure of the camera in the first networking mode and the structure of the camera in the second networking mode may be different, as shown in FIGS. 14A-14B and the like.

In some embodiments, the controllable component comprises a first network module and a second network module, the first network module having a first networking mode, and the second network module having a second networking mode. When controlling the state of the controllable component, the first network module and the second network module can be controlled so that the first network module is enabled to adopt the first networking mode in the first state, and the second network module is enabled to adopt the second networking mode in the second state.

In some embodiments, the controllable component has a plurality of functions. When controlling the state of the controllable component, the controllable component can be controlled to perform a first function of the plurality of functions in the first state, and a second function of the plurality of functions in the second state.

In some embodiments, the first function may be a fitness assistance function or an interactive entertainment function, and the second function may be a monitoring function, for example. Under the fitness assistance function, the camera can assist the target user in fitness, such as providing fitness guidance. Under the interactive entertainment function, the target user can interact with camera for entertainment, such as providing multimedia output (such as playing music or video, etc.) according to the user's instructions. Different functions are triggered according to different states of the camera, which improves the user experience.

In some embodiments, the camera (specifically, the controllable component) has a plurality of functions, and the plurality of functions cannot be performed or started at the same time. The plurality of functions can be connected to the same server or different servers. For example, the camera has a monitoring function and an accompany function. The camera connects to a monitoring server when performing the monitoring function, and connects to an accompany server when performing the escort function.

Optionally, the camera has a plurality of functions, and the plurality of functions have a certain order relationship. As an example, the second function and the third function of the plurality of functions constitute an order relationship. The order of the plurality of functions can be configured. The second function can be started first, and then the third function can be started after a certain time interval.

Optionally, the first function may also include a plurality of sub-functions, such as a fitness assistance function, an interactive entertainment function, and so on. The camera can obtain information of the target user and determine the state of the target user. When the target user is in a fitness state, the fitness assistance function is started, and when the target user is in a leisure state, the interactive entertainment function is started. The state of the target user includes the target user's actions and location, time, members, and so on. Under the interactive entertainment function, the camera enhances the interaction with the user, such as providing multimedia output (such as music or video playing, etc.). Video playing can be performed by its own equipment, such as a projection device, or by a multimedia device connected thereto, such as a TV. Under the fitness assistance function, the camera detects the user's actions and provides the user with fitness feedback.

Optionally, under the first function and the second function, the structures of the camera may be different. Using different structures under different functions can improve user experience. For example, under the condition that the first function is a fitness assistance function, the structure in FIG. 14A can be adopted to improve the interaction experience between the camera and the user, because it adopts an anthropomorphic design and the interaction experience is better. Under the condition that the second function is a monitoring function, the structure in FIG. 14B can be adopted to effectively reduce the volume of the camera, thereby reducing the possibility of the camera attracting attention and avoiding impact on the monitored object.

Optionally, under different functions, the cameras can adopt different networking modes. For example, the first networking mode (WIFI MESH) is adopted under the first function, and the second networking mode (Bluetooth MESH) is adopted under the second function, which is not restrictive.

Figure 17:
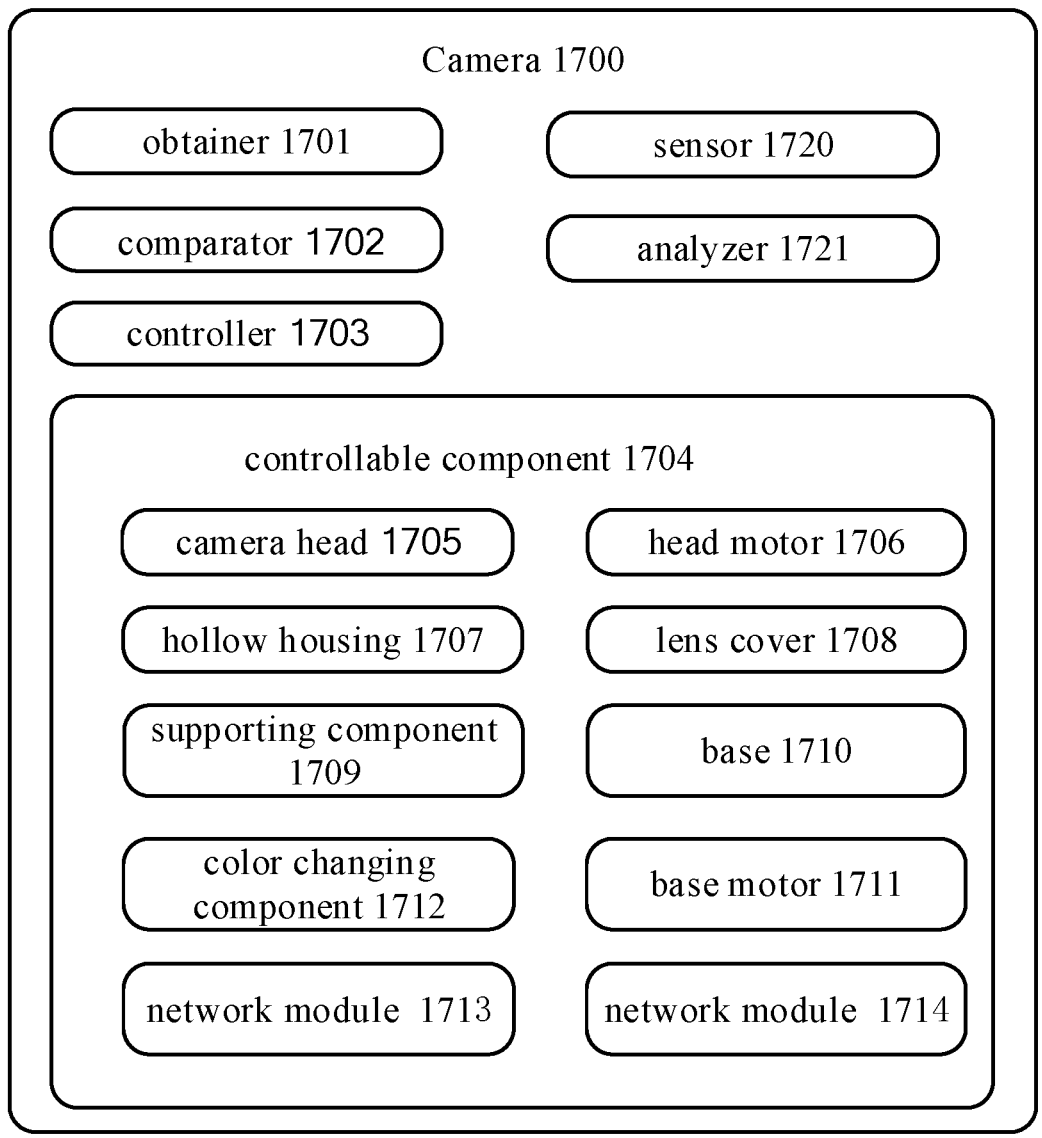
FIG. 17 shows an exemplary structural block diagram of a camera according to an embodiment of the present disclosure.

FIG. 17 shows an exemplary structural block diagram of a camera 1700 according to an embodiment of the present disclosure. The camera 1700 associates at least one associated client and a reference device, and the reference device is a gateway of a local area network to which the camera is connected. As shown in FIG. 17, the camera 1700 includes an obtainer 1701, a comparator 1702, a controller 1703, and a controllable component 1704.

The obtainer 1701 is configured to obtain a first client list of the at least one associated client and a second client list of clients that are currently connected to the same local area network as the camera by connecting with the reference device.

The comparator 1702 is configured to compare the first client list with the second client list so as to determine whether one or more of the at least one associated client are connected to the same local area network as the camera via the reference device.

The controller 1703 is configured to control a state of the controllable component 1703 so that the camera is in a first state when one or more of the at least one associated client are connected to the same local area network as the camera via the reference device and is in a second state that is different from the first state when no associated client is connected to the same local area network as the camera via the reference device.

The obtainer 1701 may be, for example, a receiver, a transceiver, or any element or device having an obtaining function. The comparator 1702 may include, for example, a processor, an integrated circuit, an analog circuit, a programmable logic device, and so on. The controller 1703 may include, for example, a processor, a microprocessor, a programmable logic device, and any element or device with control function.

The controllable component may be, for example, any component of the camera whose structure or shape can be controlled. The controller can control the state of the controllable component so that it presents a structure or form in the first state and another structure or form in the second state. This will be described in detail below.

In some embodiments, the controllable component includes a camera head 1705, and the camera head includes a lens configured to capture an image of a target object.

In some embodiments, the schematic diagram of the camera head 1705 may be as shown in FIGS. 11A-11C above. The controller may be configured to control a rotation angle of the camera head to adjust a direction in which the lens captures the image, so that in one state of the first state and the second state, the direction in which the lens captures the image is far away from an area where the target object is located, and in the other state of the first state and the second state, the direction in which the lens captures the image faces the area where the target object is located.

In some embodiments, the controllable component may further include a head motor 1706, and the controller may control the rotation angle of the camera head through the head motor 1706.

In some embodiments, the controllable component 1704 may further include a hollow housing 1707 which is opaque, the hollow housing having a first opening, the camera head being arranged in the hollow housing, and the first opening facing the area where the target object is located. The schematic diagram of the controllable component can be as shown in FIGS. 12A-12C.

In some embodiments, the controller is further configured to control a rotation angle of the camera head to adjust a direction in which the lens captures the image so that in the one state of the first state and the second state, the direction in which the lens captures the image is away from the first opening, and in the other state of the first state and the second state, the direction in which the lens captures the image faces the first opening so that the direction faces the area where the target object is located.

In some embodiments, the controllable component further includes a lens cover 1708 adapted to the first opening, and the direction in which the lens captures the image faces the first opening. The controller is further configured to control a positioning of the lens cover so that in the one state of the first state and the second state, the lens cover closes the first opening, and in the other state of the first state and the second state, the lens cover leaves the first opening so as to open the first opening. Optionally, the controller is configured to control the positioning of the lens cover so that in the one state of the first state and the second state and under the condition that the lens has captured the target image, the lens cover closes the first opening. The schematic diagram of the controllable component may be as shown in FIGS. 13A and 13B.

In some embodiments, the hollow housing further has a second opening, as shown in FIGS. 14A-14D. The controller is configured to control the camera head so that in the one state of the first state and the second state, the camera head protrudes out of the hollow housing through the second opening, and in the other state of the first state and the second state, the camera head is located in the hollow housing and the direction in which the lens captures the image faces the first opening.

In some embodiments, the hollow housing may have only the second opening and not have the first opening, as shown in FIGS. 14E and 14F. The controller is configured to control the camera head so that in the one state of the first state and the second state, the camera head protrudes out of the hollow housing through the second opening (and optionally, the direction of the lens capturing image is enabled to face the area where the target object is located), and in the other state of the first state and the second state, the camera head is located in the hollow housing.

In some embodiments, the controllable component may further include a supporting component 1709, a base 1710 and a base motor 1711, and the camera head is connected to the base via the supporting component. The base motor is configured to control a height of the camera head relative to the base via the supporting component.

In some embodiments, the controllable component further includes a color changing component 1712. The controller is configured to control the color of the color changing component so that the color of the color changing component in the first state is the first color, and the color of the color changing component in the second state is the second color. Optionally, the controller is configured to control the color of the color changing component so that the color of the color changing component in the one state of the first state and the second state is different from the color of the wall of the environment where the camera is located, and the color of the color changing component in the other state of the first state and the second state is the same as the color of the wall of the environment where the camera is located. Optionally, the controller is configured to determine the color of the color changing component in the first state and in the second state according to the color preference of the target object or user.

In some embodiments, the controllable component includes a network module 1713, and the network module has a plurality of networking modes. The controller is configured to control the network module so that in the first state, the network module adopts the first networking mode of the plurality of networking modes, and in the second state, the network module adopts the second networking mode of the plurality of networking modes. The network module may be a wired network module or a wireless network module capable of networking for communication, such as a wireless transceiver or the like.

In some embodiments, the controllable component comprises a network module 1713 and a network module 1714, the network module 1713 having a first networking mode, and the network module 1714 having a second networking mode. The controller is configured to control the network module 1713 and the network module 1714 so that the first module 1713 is enabled to adopt the first networking mode in the first state, and the network module 1714 is enabled to adopt the second networking mode in the second state.

In some embodiments, the controllable component has a plurality of functions. The controller is configured to control the controllable component to perform a first function of the plurality of functions in the first state, and a second function of the plurality of functions in the second state.

In some embodiments, the camera may further include a sensor 1720 and an analyzer 1721. The sensor 1720 may be an image sensor, which may sense an image in the monitoring area and transmit the sensed image to the analyzer 1721. The analyzer can analyze and recognize the image to, for example, determine whether there is a target object in the monitoring area. In other embodiments, the sensor can also sense a distance between the camera and the client (that is, the terminal where the client is located).

In some embodiments, when the distance between the camera and the client is less than a preset distance threshold or there is a target object in the monitoring area, the controller may control the controllable component so that the camera is in the first state. And, when the distance between the camera and the client (that is, the terminal where the client is located) is greater than a preset distance threshold or there is no target object in the monitoring area, the controller may control the controllable component so that the camera is in the second state. Similar to the above description, the controllable component can be controlled to present different structures and forms in the first state and the second state.

In some embodiments, when a target object is detected in the monitoring area, the controller may control the controllable component so that the camera is in the first state. When no target object is detected in the monitoring area, the controller may control the controllable component so that the camera is in the second state. For example, when a target person is detected by the analyzer in the monitoring area, the controller may control a positioning of the lens cover so that the lens cover closes the first opening as shown in FIG. 13A, and when no target object is detected by the analyzer in the monitoring area, the controller may control a positioning of the lens cover so that the lens cover leaves the first opening so as to open the first opening as shown in FIG. 13B. In this case, optionally, the camera may not include the obtainer and the comparator. Similar to the above description, the controllable component can be controlled to present different structures and forms in the first state and the second state. The target object can be set by owner of the camera in the camera or the server of the camera through the camera application.

In some embodiments, when a target object A is detected and a target object B is not detected in the monitoring area, the controller may control the controllable component so that the camera is in the first state. And when the target object B is detected and the target object A is not detected in the monitoring area, the controller may control the controllable component so that the camera is in the second state. For example, when the target person A (e.g., a child) is detected and the target person B (e.g., a parent) is not detected by the analyzer in the monitoring area, the controller may control the rotation angle of the camera head so that the direction in which the lens captures the image is adjusted to face the first opening as shown in FIG. 12A. For example, when the analyzer detects the target person B (e.g., a parent) in the monitoring area and does not detects the target person A (e.g., a child) in the monitoring area, the controller may control the rotation angle of the camera head so that the direction in which the lens captures the image is away from the first opening as shown in FIG. 12B or FIG. 12C. In this case, optionally, the camera may not include the obtainer and the comparator. Similar to the above description, the controllable component can be controlled to present different structures and forms in the first state and the second state.

In some embodiments, when the target object A and the target object B are detected in the monitoring area at the same time, the controller may control the controllable component based on a priority of the target object A and a priority of the target object B so that the camera is in the first state or in the second state. If the priority of the target object A is higher than the priority of the target object B, the controller will control the controllable component so that the camera is in the first state. If the priority of the target object is detected is higher than the priority of the target object A, then the controller will control the controllable component so that the camera is in the second state. Similar to the above description, the controllable component can be controlled to present different structures and forms in the first state and the second state.

Figure 18:
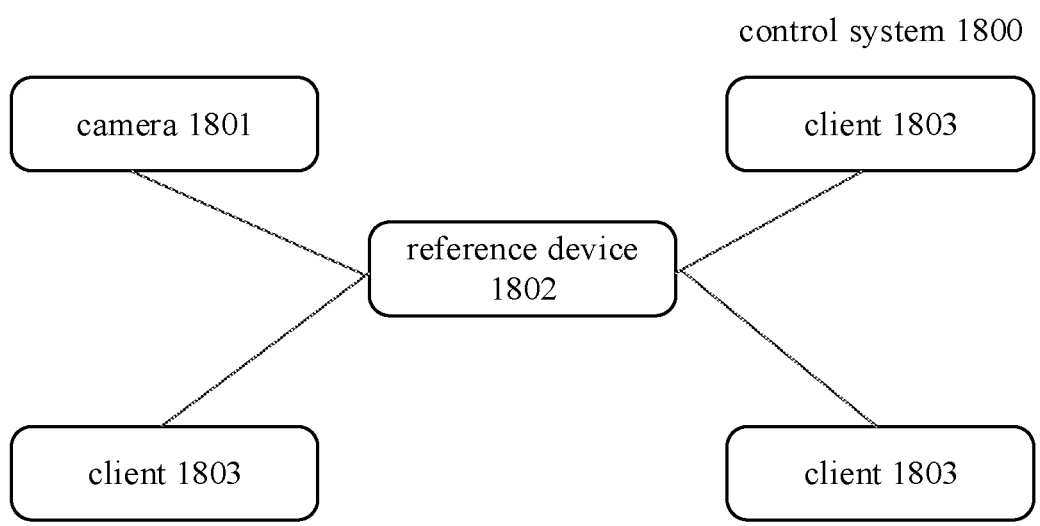
FIG. 18 shows a schematic diagram of a control system according to an embodiment of the present disclosure.

FIG. 18 shows a schematic diagram of a control system 1800 according to an embodiment of the present disclosure. As shown in FIG. 18, the control system includes a camera 1801, a reference device 1802, and at least one client (or terminal) 1803. The camera 1801 may be the camera described with reference to FIG. 17. The reference device 1802 is configured as be a gateway of a local area network to which the camera is connected. The at least one client 1803 is configured to be currently connected to the same local area network as the camera by connecting with the reference device. The camera can be controlled according to the method described with reference to FIG. 10.

An embodiment of this disclosure can further comprise articles of manufacture. The articles of manufacture can include a storage medium for storing logic. The examples of the storage medium can include one or more types of computer readable storage media that can store electronic data, including volatile memory or nonvolatile memory, removable or unremovable memory etc. The examples of the logic can include various software units, such as a software component, a program, an application, a computer program, an application program, a system program, a machine program, an operating system software, a middleware, a firmware, a software module, a routine, a subprogram, a function, a method, a process, a software interface, an application program interface (API), an instruction set, a computing code, or any combination thereof. In one embodiment, for example, the articles of manufacture can store computer executable program instructions, when they are executed by the computer, the computer is enabled to execute the method and/or the operation according to the embodiments described.

It should be noted that unless otherwise specified, "first", "second" and/or the like are not intended to imply a temporal aspect, a space aspect, an ordering, etc. Rather, such terms are only used as identifiers, names, etc. for features, elements, items, etc. For example, a first object and a second object generally correspond to object A and object B, or two different or two identical objects, or the same object.

In addition, as used herein, the word "or" is intended to refer to inclusive "or" rather than exclusive "or". In addition, unless otherwise specified or it is clear from the context that it refers to the singular form, "a" and "an" as used in the present application are generally interpreted as "one or more". Furthermore, at least one of A and B and/or similar expressions generally mean A or B or both A and B. In addition, to the extent that "includes", "having", "has", "with", and/or variants thereof are used in either the detailed description or the claims, such terms are intended to be inclusive in a manner similar to the term "comprising".

Various aspects of this disclosure may be used solely, in combination or in various arrangements not discussed specifically in the embodiments described above; therefore, its application is not limited to the details and arrangements of the components expounded in the above description or shown in the figures. For example, some aspects described in one embodiment may be combined with some aspects described in other embodiments in any way.

What are stated above are alternative embodiments of this disclosure. It should be pointed out that the ordinary skilled person in the art, on the premise of not departing from the principle of this disclosure, can also make some improvements and modifications. These improvements and modifications should also be regarded as the protection scopes of this disclosure.

The invention claimed is:

1. A method for controlling a camera, the camera comprising a controllable component and associating with at least one associated client and a reference device, the reference device being a gateway of a local area network to which the camera is connected, the method comprises:
obtaining a first client list of the at least one associated client and a second client list of clients that are currently connected to the same local area network as the camera by connecting with the reference device;
comparing the first client list with the second client list so as to determine whether one or more of the at least one associated client are connected to the same local area network as the camera via the reference device; and
controlling a state of the controllable component so that the camera is in a first state when one or more of the at least one associated client are connected to the same local area network as the camera via the reference device and is in a second state that is different from the first state when no associated client is connected to the same local area network as the camera via the reference device.

2. The method of claim 1, wherein the controllable component comprises a camera head, and the camera head comprises a lens configured to capture an image of a target object;
wherein, controlling the state of the controllable component comprises:
controlling a rotation angle of the camera head to adjust a direction in which the lens captures the image, so that in one state of the first state and the second state, the direction in which the lens captures the image is far away from an area where the target object is located, and in the other state of the first state and the second state, the direction in which the lens captures the image faces the area where the target object is located.

3. The method of claim 1, wherein the controllable component comprises a camera head and a hollow housing which is opaque, the camera head comprising a lens configured to capture an image of a target object, the hollow housing having a first opening, the camera head being arranged in the hollow housing, and the first opening facing the area where the target object is located;
wherein, controlling the state of the controllable component comprises:
controlling a rotation angle of the camera head to adjust a direction in which the lens captures the image so that in the one state of the first state and the second state, the direction in which the lens captures the image is away from the first opening, and in the other state of the first state and the second state, the direction in which the lens captures the image faces the first opening so that the direction faces the area where the target object is located.

4. The method of claim 1, wherein the controllable component comprises a camera head and a hollow housing which is opaque, the camera head comprising a lens configured to capture an image of a target object, the hollow housing having a first opening, the camera head being arranged in the hollow housing, and the first opening facing the area where the target object is located, and wherein the controllable component further comprises a lens cover adapted to the first opening, and the direction in which the lens captures the image faces the first opening;
wherein, controlling the state of the controllable component comprises:
controlling a positioning of the lens cover so that in the one state of the first state and the second state, the lens cover closes the first opening, and in the other state of the first state and the second state, the lens cover leaves the first opening so as to open the first opening.

5. The method of claim 4, wherein controlling the positioning of the lens cover comprises:
controlling the positioning of the lens cover so that in the one state of the first state and the second state and under the condition that the lens has captured the target image, the lens cover closes the first opening.

6. The method of claim 1, wherein the controllable component comprises a camera head and a hollow housing which is opaque, the camera head comprising a lens configured to capture an image of a target object, the camera head being arranged in the hollow housing, and wherein the hollow housing further has a second opening;
wherein, controlling the state of the controllable component comprises:
controlling the camera head so that in the one state of the first state and the second state, the camera head protrudes out of the hollow housing through the second opening, and in the other state of the first state and the second state, the camera head is located in the hollow housing.

7. The method of claim 6, wherein the hollow housing has a first opening and the first opening faces the area where the target object is located
wherein, controlling the state of the controllable component further comprises:
controlling the camera head so that in the other state of the first state and the second state, the camera head is located in the hollow housing and the direction in which the lens captures the image faces the first opening.

8. The method of claim 1, wherein the controllable component further comprises a color changing component;
wherein, controlling the state of the controllable component comprises:
controlling the color of the color changing component so that the color of the color changing component in the first state is the first color, and the color of the color changing component in the second state is the second color.

9. The method of claim 1, wherein the controllable component comprises a network module, and the network module has a plurality of networking modes;
   wherein, controlling the state of the controllable component comprises:
   controlling the network module so that in the first state, the network module adopts the first networking mode of the plurality of networking modes, and in the second state, the network module adopts the second networking mode of the plurality of networking modes.

10. The method according to claim 1, wherein the controllable component comprises a first network module and a second network module, the first network module having a first networking mode, and the second network module having a second networking mode,
   wherein, controlling the state of the controllable component comprises:
   controlling the first network module and the second network module so that the first network module is enabled to adopt the first networking mode in the first state, and the second network module is enabled to adopt the second networking mode in the second state.

11. The method of claim 1, wherein the controllable component has a plurality of functions;
   wherein, controlling the state of the controllable component comprises:
   controlling the controllable component to perform a first function of the plurality of functions in the first state, and a second function of the plurality of functions in the second state.

12. A camera associating with at least one associated client and a reference device, the reference device being a gateway of a local area network to which the camera is connected, and the camera comprises:
   an obtainer configured to obtain a first client list of the at least one associated client and a second client list of clients that are currently connected to the same local area network as the camera by connecting with the reference device;
   a comparator configured to compare the first client list with the second client list so as to determine whether one or more of the at least one associated client are connected to the same local area network as the camera via the reference device;
   a controllable component;
   a controller configured to control a state of the controllable component so that the camera is in a first state when one or more of the at least one associated client are connected to the same local area network as the camera via the reference device and is in a second state that is different from the first state when no associated client is connected to the same local area network as the camera via the reference device.

13. The camera of claim 12, wherein the controllable component comprises a camera head, and the camera head comprises a lens configured to capture an image of a target object.

14. The camera of claim 13, wherein the controller is configured to control a rotation angle of the camera head to adjust a direction in which the lens captures the image, so that in one state of the first state and the second state, the direction in which the lens captures the image is far away from an area where the target object is located, and in the other state of the first state and the second state, the direction in which the lens captures the image faces the area where the target object is located.

15. The camera of claim 13, wherein controllable component further comprises a hollow housing which is opaque, the hollow housing having a first opening, the camera head being arranged in the hollow housing, and the first opening facing the area where the target object is located.

16. The camera of claim 15, wherein the controller is further configured to control a rotation angle of the camera head to adjust a direction in which the lens captures the image so that in the one state of the first state and the second state, the direction in which the lens captures the image is away from the first opening, and in the other state of the first state and the second state, the direction in which the lens captures the image faces the first opening so that the direction faces the area where the target object is located.

17. The camera of claim 15, wherein the controllable component further comprises a lens cover adapted to the first opening, and the direction in which the lens captures the image faces the first opening; and
   wherein the controller is further configured to control a positioning of the lens cover so that in the one state of the first state and the second state, the lens cover closes the first opening, and in the other state of the first state and the second state, the lens cover leaves the first opening so as to open the first opening.

18. The video camera of claim 17, wherein the controller is further configured to control the positioning of the lens cover so that in the one state of the first state and the second state and under the condition that the lens has captured the target image, the lens cover closes the first opening.

19. The camera of claim 13, wherein the controllable component further comprises a hollow housing which is opaque, the hollow housing having a second opening, the camera head being arranged in the hollow housing; and
   wherein, the controller is configured to control the camera head so that in the one state of the first state and the second state, the camera head protrudes out of the hollow housing through the second opening, and in the other state of the first state and the second state, the camera head is located in the hollow housing.

20. The camera of claim 19, wherein the hollow housing has a first opening and the first opening faces the area where the target object is located
   wherein, the controller is configured to control the camera head so that in the other state of the first state and the second state, the camera head is located in the hollow housing and the direction in which the lens captures the image faces the first opening.

21. The camera of claim 12, wherein the controllable component further comprises a color changing component; and
   wherein the controller is configured to control the color of the color changing component so that the color of the color changing component in the first state is the first color, and the color of the color changing component in the second state is the second color.

22. The camera of claim 12, wherein the controllable component comprises a network module, and the network module has a plurality of networking modes; and
   wherein the controller is configured to control the network module so that in the first state, the network module adopts the first networking mode of the plurality of networking modes, and in the second state, the network module adopts the second networking mode of the plurality of networking modes.

23. The camera of claim 12, wherein the controllable component comprises a first network module and a second network module, the first network module having a first networking mode, and the second network module having a second networking mode,
- wherein the controller is configured to control the first network module and the second network module so that the first network module is enabled to adopt the first networking mode in the first state, and the second network module is enabled to adopt the second networking mode in the second state.

24. The camera of claim 12, wherein the controllable component has a plurality of functions; and
- wherein the controller is configured to control the controllable component to perform a first function of the plurality of functions in the first state, and a second function of the plurality of functions in the second state.

* * * * *